US006326713B1

(12) United States Patent
Judson

(10) Patent No.: US 6,326,713 B1
(45) Date of Patent: Dec. 4, 2001

(54) A.C. ELECTRICAL MACHINE AND METHOD OF TRANSDUCING POWER BETWEEN TWO DIFFERENT SYSTEMS

(76) Inventor: John Judson, 38 John Jill Close, Rugeley, Staffordshire, WS15 2AF (GB)

( * ) Notice: Subject to any disclaimer, the term of this patent is extended or adjusted under 35 U.S.C. 154(b) by 0 days.

(21) Appl. No.: 09/214,161

(22) PCT Filed: Jun. 25, 1997

(86) PCT No.: PCT/GB97/01696

§ 371 Date: Jun. 7, 1999

§ 102(e) Date: Jun. 7, 1999

(87) PCT Pub. No.: WO97/50164

PCT Pub. Date: Dec. 31, 1997

(30) Foreign Application Priority Data

Jun. 25, 1996 (GB) .................................................. 9613330
Jan. 28, 1997 (GB) .................................................. 9701722

(51) Int. Cl.[7] .......................... H02K 47/00; H02K 47/04; H02K 16/00; H01F 21/06
(52) U.S. Cl. .......................... 310/112; 310/114; 310/180; 336/131; 336/118
(58) Field of Search ..................................... 310/112, 114, 310/180; 336/115, 117, 120, 122, 123, 131, 130

(56) References Cited

U.S. PATENT DOCUMENTS

| | | | | |
|---|---|---|---|---|
| 3,280,400 | * | 10/1966 | Roe ...................................... | 318/243 |
| 3,405,296 | * | 10/1968 | Stilley et al. ......................... | 310/116 |
| 3,728,564 | * | 4/1973 | De Rugeris ........................... | 310/168 |
| 4,229,689 | * | 10/1980 | Nickoladze ........................... | 310/112 |
| 4,470,090 | * | 9/1984 | Carr ....................................... | 361/19 |
| 4,701,691 | * | 10/1987 | Nickoladze ........................... | 310/112 |
| 4,785,213 | * | 11/1988 | Satake ................................... | 310/116 |
| 5,194,773 | | 3/1993 | Clarke ................................... | 310/112 |
| 5,254,894 | * | 10/1993 | Satake et al. ......................... | 310/114 |
| 5,274,291 | | 12/1993 | Clarke ................................... | 310/112 |
| 5,519,275 | * | 5/1996 | Scott et al. ........................... | 310/112 |

FOREIGN PATENT DOCUMENTS

| | | | | |
|---|---|---|---|---|
| 2827386 | 1/1980 | (DE) | .............................. | H01R/39/00 |
| 2293702 | 4/1996 | (GB) | .............................. | H02M/1/00 |
| 9504363 | 2/1995 | (WO) | .............................. | H01F/31/00 |
| 9526069 | 9/1995 | (WO) | .............................. | H02K/7/02 |

* cited by examiner

*Primary Examiner*—Burton S. Mullins
(74) *Attorney, Agent, or Firm*—Brian T. Ster; Doreen J. Gridley; Ice Miller

(57) ABSTRACT

A structure for an a.c. electrical machine and method of transducing power between two different systems. The machine comprises two electrically balanced transformers which are generally, but not exclusively, three phase. Initially the transformers are in balance and no currents flow in the secondary windings of the transformers. An electrical or mechanical imbalance is introduced between the transformers causing current to circulate in the secondary windings. The secondary windings in one embodiment are provided on a rotor in which case the currents induced in the secondary windings cause a torque to be exerted on the rotor. It is also possible to arrange the machine as a transformer or alternator.

47 Claims, 24 Drawing Sheets

Locus of Vcd & Vkl shown dotted

A.C. ELECTRICAL MACHINE AND METHOD OF TRANSDUCING POWER BETWEEN TWO DIFFERENT SYSTEMS

This invention relates to new structures for alternating current electrical machines, and methods of transducing power.

Conventional, direct current rotating electrical machines are well known devices, each typically comprising a magnetic yoke providing a stationary magnetic field, within which an armature rotates. The armature typically comprises a laminated steel rotor carrying a set of electrically conductive coils, each of which is connected at the appropriate times to a direct current supply, via a commutator and associated brushes, so as to produce electric current in conductors surrounded by the main, stationary field, thus summating a stream of torque impulses over a wide range of rotational speeds. The essence of the action is that the stationary magnetic field, the current carried by the rotor conductors, and the direction of their permitted motion are all mutually at right angles, producing a torque reaction upon the rotor and that the stationary magnetic field flux is locally distorted, but largely unaltered by the armature current. This form of electric machine has advantages of speed and torque control and in small ratings can function even when supplied from alternating current supplies, but in common use, the need to convert the public A.C. supply to a D.C. supply at variable voltage introduces disadvantages of harmonic currents and reduced power factor. Moreover, the brushes gradually wear away and require periodic replacement, neglect of which can engender serious damage.

Conventional alternating current rotating machines are well known devices, typically comprising a magnetic yoke, carrying a set of coils connected to a multiphase mains supply and physically arranged to produce a rotating magnetic field within which is a rotor. The rotor is usually of laminated steel and may have one of several typical forms, as follows:

It may have magnetic saliency by virtue of shape, or by virtue of the injection of A.C. or D.C. electrical power via slip-rings and brush gear. It then rotates in magnetic synchronism with the stator field.

It may have a set of peripheral conductors, which are short-circuited, typified as the squirrel cage. It then rotates in equilibrium, asynchronously with the stator field. Sometimes the conductors are connected to slip-rings, so that external electrical resistance can be introduced for starting purposes.

The essence of the action is that the magnetic field rotates and the rotor is constrained to follow. Low-power, A.C. machines are usually connected to a single-phase, stator supply and equipped with additional devices to ensure that they rotate only in the desired direction. These forms of the electrical rotating machine have advantages of simple and robust construction, but have disadvantages for speed adjustment and torque control in that the source of the main power generally must be a variable frequency supply, which typically is generated by elaborate electronic control equipment switching the stator currents at relatively high frequencies.

It is an aim of the present invention to ameliorate at least some of the problems of the prior art.

According to a first aspect of the invention there is provided an a.c. electrical machine comprising at least two transformers balanced in magnetic fields being, inductively coupled and having interconnected secondaries adapted to permit balance of opposed induced voltages and further comprising an unbalancing means, the transformers being such that their primary coils are not rigidly attached to their secondary coils, the arrangement being such that the unbalancing means can be used to introduce an electrical or magnetic imbalance between the transformers, resulting in force between the primary and secondary coils, the magnetic fields being generated solely or substantially solely by current flowing through the transformer coils.

The skilled person will appreciate that when the two transformers are in balance no currents will flow in the secondary coils and only a magnetising current will flow in the primary coils.

According to another aspect of the invention there is provided an a.c electrical machine comprising at least two transformers and an unbalancing means for introducing an imbalance between the two transformers, the transformers being such that their primary coils are interleaved with each other and their secondary coils are interleaved with each other, the arrangement being such that the unbalancing means can be used to introduce an electrical imbalance between the transformers.

Such an arrangement may be used in a number of ways. For instance the secondary coils may arranged so that they are free to rotate with respect to the primary windings in which case the machine may be used as a motor or generator.

Alternatively, the secondary coils may be arranged so that they are fixed or can only be moved through a relatively small range of movement, for example there may be phase adjustment means provided to move the primary and secondary coils relative to each other angularly, between first and second operative positions. The relative movement may be through a number of degrees with respect to primary coils in which case the machine may be used as an electrical transformer.

The skilled person will appreciate that a transformer comprises a primary coil winding and a secondary coil winding which are linked by an electric/magnetic flux so that electrical power is transferred between the coils.

Flux linkage from the primary coils of the transformers to the secondary coils of the transformers may be across an air gap. Such an arrangement has the advantage that the primary and secondary coils are not physically attached to each other.

The secondary coils may be allowed to rotate with respect to the primary coils. Such a device may function as an alternating current rotary induction machine.

The alternating current induction machine may be adapted, in use, to be operated at variable speeds from a fixed frequency supply. Such a machine provides a simple structure such as that of an ac induction motor but which has the advantageous action of a dc machine.

The a.c. electrical machine may have a rotor and may have a stator.

Preferably the machine has at least two sets of main stator coils and preferably the stator coils form the primary coils of the transformers. This arrangement provides a convenient way of arranging the stator windings.

The rotor may have at least two three phase circuits. Such an arrangement is beneficial to co-operate with the three phase circuits arranged in the stator should three phase currents be flowing there. Preferably the three phase circuits comprise the secondary coils of the transformers.

The three phase circuits arranged on the rotor may comprise at least two distinct coils or they may comprise a single coil which acts as at least two three phase circuits, or there may be more than two coils.

In use, once the initial balance condition of the transformers is disturbed, current may be caused to flow in some or all of the three phase circuits of the rotor and a torque acting on the rotor may be caused. Such currents maintain equilibrium of the physical/electrical properties of the a.c. machine and the arrangement provides a way of producing rotation of the rotor.

Preferably, there are provided in addition to the main stator windings control stator windings. Such windings allow the main stator windings to be influenced.

There may be a control stator winding for each main stator windings. Such an arrangement allows each of the main stator windings to be unbalanced individually.

In use, the imbalance between the two transformers may be caused by inducing currents in the control windings which modify the currents flowing in the main stator windings. This provides a simple and controllable way of introducing the imbalance.

Alternatively, or additionally, in use, the imbalance between the transformers may be caused by adjusting the voltages across the main stator coils.

Yet another alternative or additional technique for, in use, imposing the imbalance between the transformers may be to insert or remove part of a core material (which influences the main stator coil).

Still yet another alternative, or additional, technique for, in use, imposing the imbalance between the transformers may be to differentially change taps of the transformers.

Causing an imbalance between the transformers as described by any of the above means will induce currents in the circuits of the secondary coils (The secondary coil circuits may be single phase, may be three phase or may have more than three phases). These induced currents will restore balance but will cause the rotor to rotate or produce a mechanical torque.

The person skilled in the art will appreciate that a three phase winding can be arranged in a star or a delta. Assuming there to be only two windings present on the stator it may be possible to arrange the windings of the stator in any of the following combinations:

| Coil 1 | Coil 2 |
|--------|--------|
| star   | star   |
| star   | delta  |
| delta  | star   |
| delta  | delta  |

The skilled person will also appreciate that if the number of coils increases beyond two then these will be able to be arranged in a variety of combinations.

Any three phase circuits present on the rotor may also be able to be arranged in a variety of combinations of star and delta arrangements.

As discussed in the specific description of this specification there are various merits and demerits of different arrangements of the stator and rotor three phase circuits/ windings.

The primary and secondary coils may be arranged on a single magnetic yoke or may be mounted as on a stator and on a rotor which are constrained from continuous rotation in which in either case the machine, in use, may function as a variable transformer.

Alteration of the of bias current flowing in the control windings may cause the voltage of the output to vary. Such an arrangement provides a suitable way of electrically adjusting the output current of the transformer.

The position of the secondary coils relative to the primary coils may be adjustable. An advantage of such an adjustment is that the phase of the output voltages can be adjusted in common, relative to the primary supply.

Preferably, the number of slots which are present in the rotor is a multiple of six. This has the advantage that performance from the machine is improved.

According to a further aspect of the invention there is provided an alternating current rotary induction machine which is adapted, in use, to be operated at variable speeds from a fixed frequency supply.

According to a further aspect of the invention there is provided a method of transducing power from one system to another system comprising providing at least two transformers having their primary coils interleaved and their secondary coils interleaved, the arrangement being such that power is transduced by introducing an imbalance between the two transformers.

Preferably, if there is a frequency difference between the supply of the two transformers, rotation between a primary coil and a secondary coil occurs.

According to a further aspect of the invention there is provided a method of controlling an a.c. rotating machine comprising arranging at least two transformers such that the primary coils of the transformers are provided on the stator and the secondary coils of the transformer provided on the rotor and in which control of the machine is achieved by introducing an imbalance between the two transformers which induces currents in the rotor causing a torque to be exerted on the rotor.

According to a further aspect of the invention there is provided an a.c. electrical machine comprising at least two transformers and an unbalancing means for introducing an imbalance between the two transformers, the transformers being such that their primary coils are interleaved with each other and their secondary coils are interleaned with each other, the arrangement being such that the unbalancing means can be used to introduce an electrical imbalance between the transformers.

Embodiments of the invention will now be described by way of example and with reference to the accompanying drawings of which:

FIG. 1 section through a stator and a rotor of an a.c. motor of one embodiment of the present invention;

FIG. 2 side elevation of an end portion of the rotor of the motor of FIG. 1 showing a transformer;

FIG. 3 a schematic diagram showing the rotor and stator of a multi phase version of the motor of FIG. 1;

Figure 1:
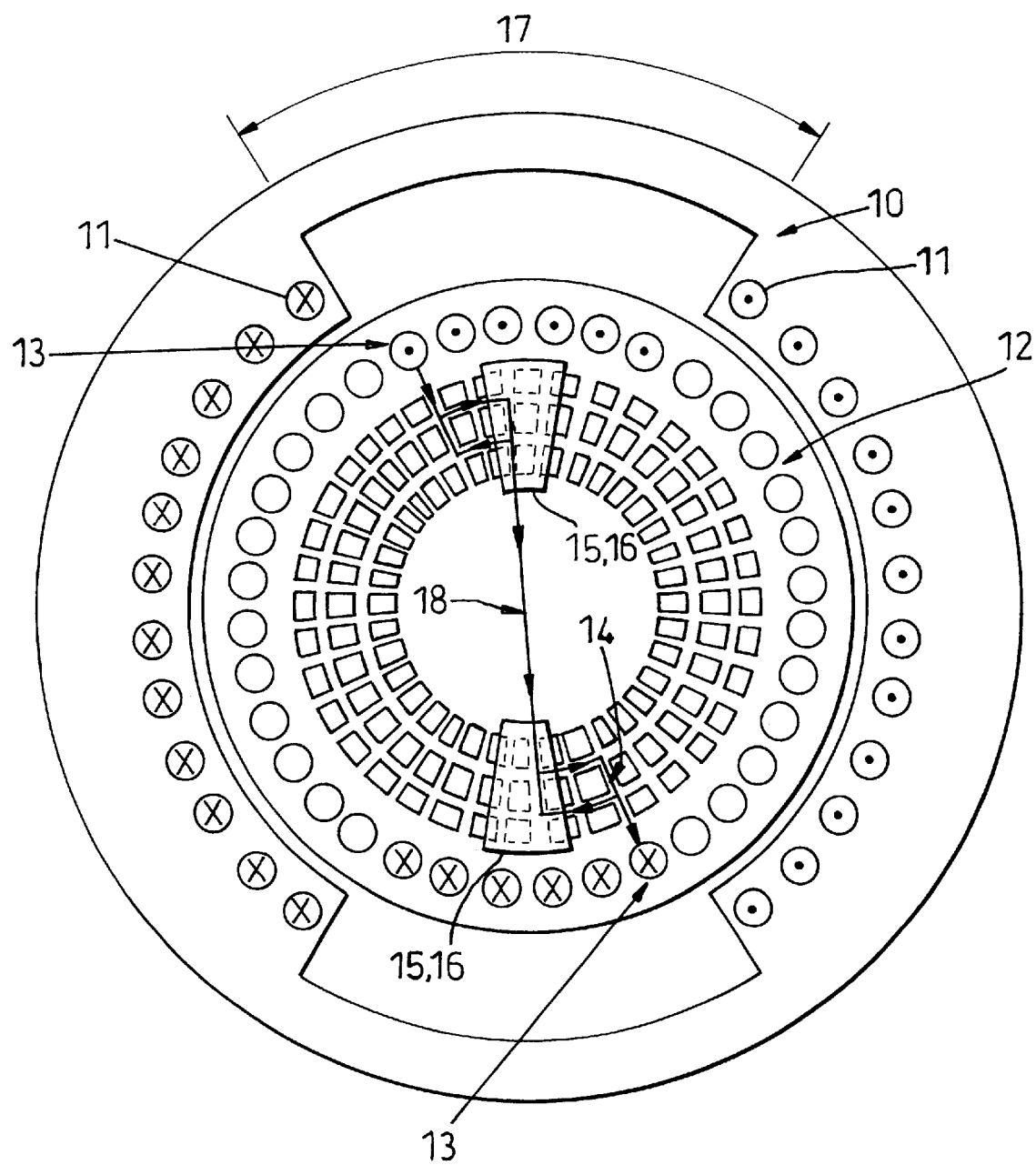

In the most basic form the invention can be realised by an arrangement as shown in FIGS. 1 to 4 which show a rotor 12 within a stator 10.

The stator 10 carries a continuous winding 11 embedded in the pole faces and parallel 18 with, the axis of rotation, energised by alternating current at a fixed frequency to produce a pulsating, stationary magnetic field between the poles. The rotor 12 carries a set of many independent windings 13 each having one or more turns occupying two diametrically opposite slots in the length of the rotor and electrically connected to two diametrically displaced secondary windings 14 of a commutating transformer 3, a stationary primary 15 of which is wound upon a laminated core 16 having 3 limbs radially disposed the form of an "E" and energised with alternating current at the same frequency as that in winding 11, at a constant phase relationship in time such as to maximise reaction between the resultant magnetic fields.

Figure 2:
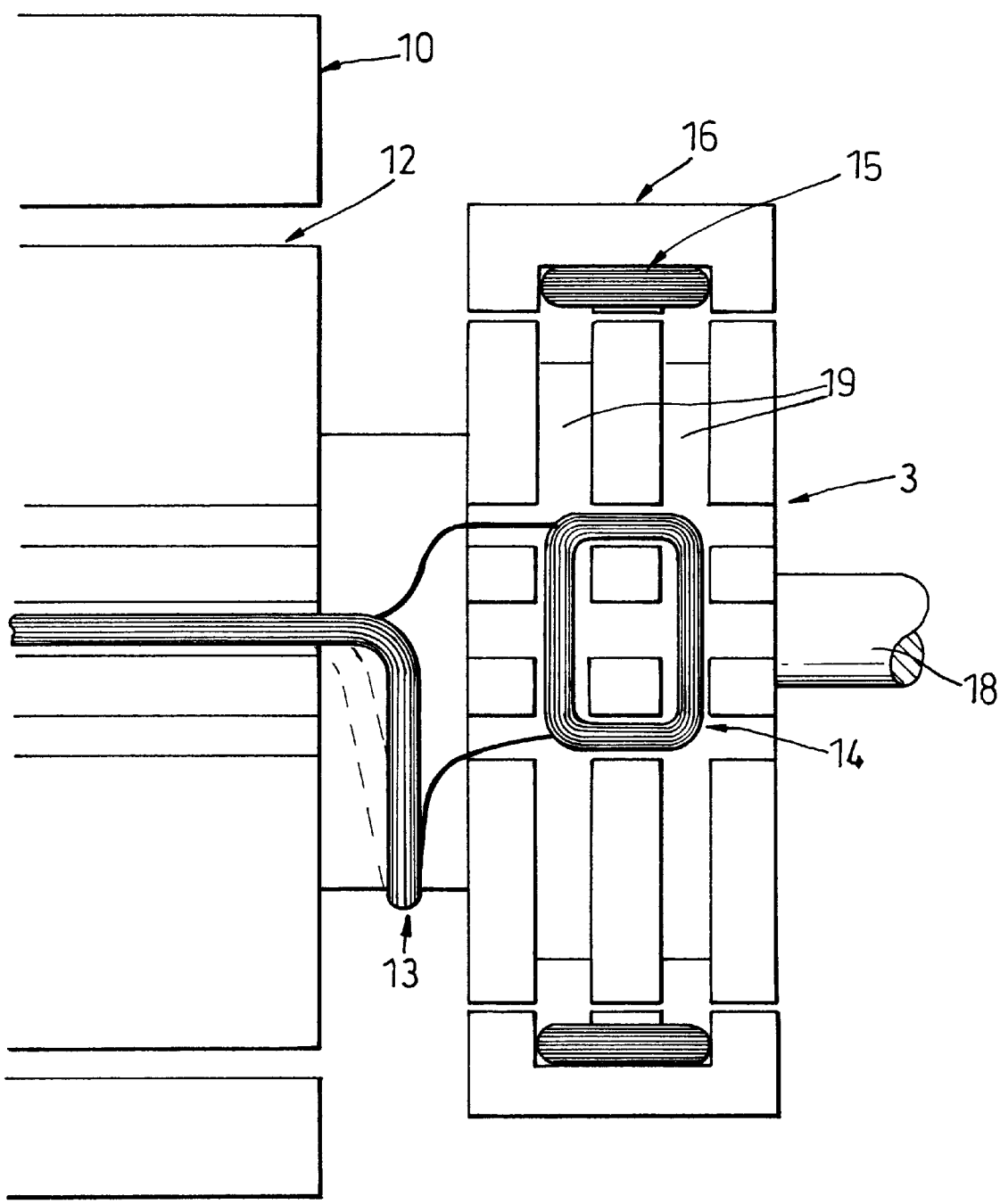

As can be most clearly seen in FIG. 2 the commutating transformer 3 is axially displaced from the stator 10 so that the secondary windings 14, stationary primary windings 15 and laminated core 16 are outside of the stator 10.

Two possible locations are shown at which primaries 15 may be placed. (A primary 15 could be placed at either of the positions but to increase the torque on the rotor 12 a primary coil is placed at both of the possible positions). The angular separation between these locations and between opposite sides of coils 13 equals the angular pole pitch. For the two-pole machine depicted in FIG. 1 the pole pitch is a semicircle, but the arrangement can be readily extended to any number of pole-pairs. The arc of rotation occupied by magnetic coupling of transformer secondary 14 to the primary winding 15 is arranged to be less than the arc 17 between the field poles, so as to avoid significant interaction of winding 11 with the transformer, which is rated to transmit only field power required to magnetise the rotor and stator.

FIG. 2 illustrates one practical arrangement of the commutating transformer typical secondary 14 on an extension of the rotor slotted lamination pack.

Coil 14 may partly overlay and be overlaid by adjacent coils and is recessed in two peripheral slots 19 and the extended axial slots of the rotor. When not adjacent to the primary 15, the coil 14 exhibits relatively low inductive reactance and does not greatly affect the voltage and current induced in winding 13, which is conditioned partly by winding 11, partly by the velocity of the conductors through the magnetic field and partly by the rate of change of the field, itself. The latter is an unavoidable consequence of using alternating current energisation and may be reduced by choosing, where possible the lowest acceptable supply frequency; e.g. in self contained, mobile traction systems, and the highest conductor velocity; e.g. in large diameter, or high speed machines.

In general the physical size of electrical machines can be reduced by operating at the highest practicable frequency and therefore compromise is necessary for optimum design. For example, the commutating transformer may be reduced in size if energised with a high frequency supply, pulse width modulated to produce the required waveform of stationary magnetic field alternation. In such a case, demodulation may be effected by means of stationary field windings tuned to resonance at the frequency of the main power. Moreover there is possibility to avoid use of the commutating transformer altogether, to individually close the circuits of the rotor windings 13 and to excite the stationary field by means of stationary windings which may be either directly energised from a suitable a.c. supply at the main power frequency, or may be directly or indirectly energised from a suitably modulated high frequency supply. It is inevitable that the windings 13, intersected by the stationary magnetic field will collectively oppose the field and will reduce its effective flux density, therefore use of the commutating transformer can be regarded as a stratagem, beneficial in certain circumstances, to transfer some but not all of the rotor windings 13 into assisting production of the stationary field, rather than totally opposing it. Use of the resonant main field winding with a modulated high frequency supply can be regarded as another stratagem with a different objective of optimising the working voltage and hence the working magnetic flux of the main field.

Figure 3:
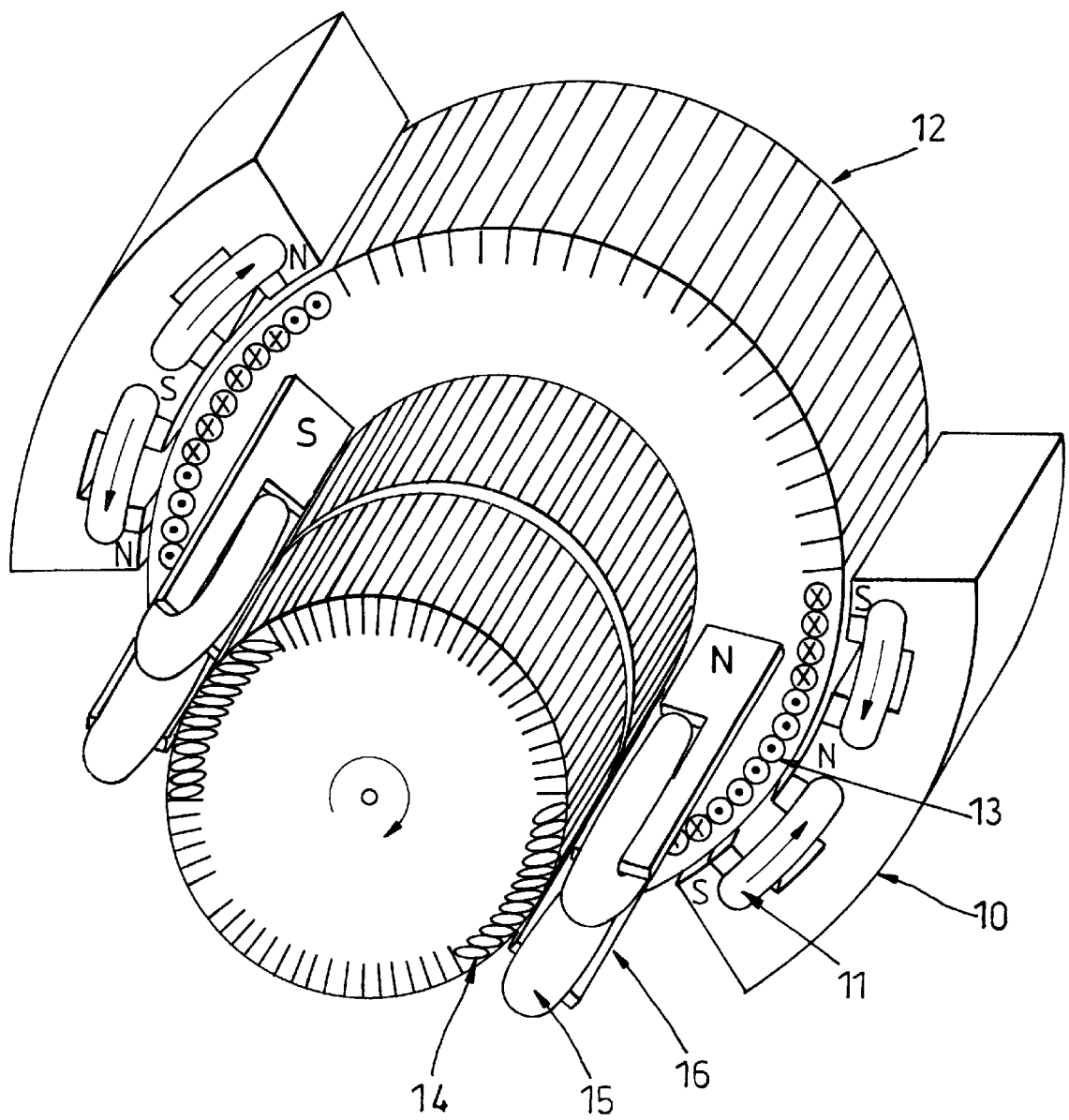
Figure 4:
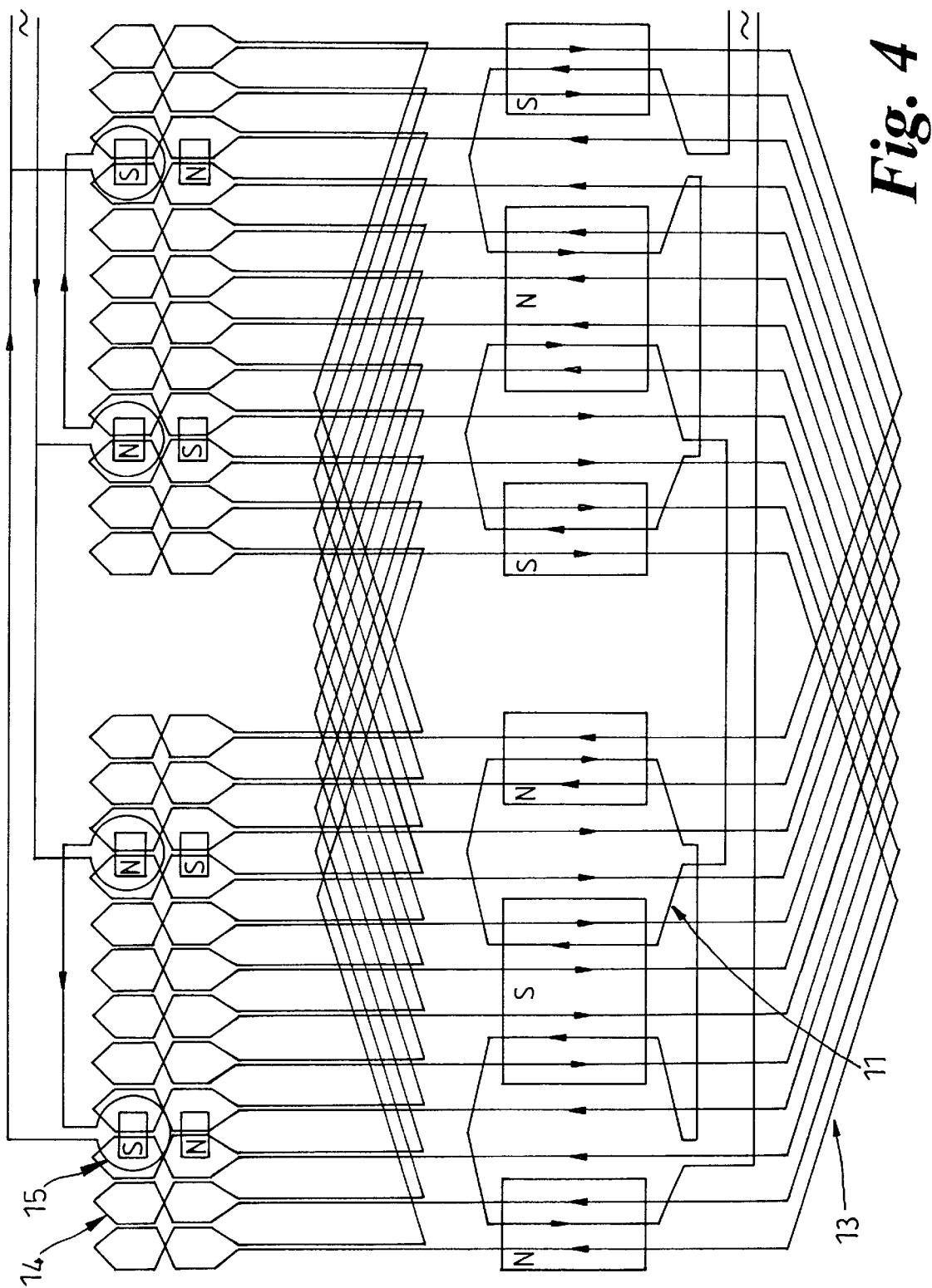
FIG. 4 shows a winding diagram for the motor of FIG. 3.

To facilitate construction using multiple independent pairs of stator field poles, or to permit operation from multiphase alternating current supplies, the example described is readily capable of extension including but not limited to the arrangement illustrated in FIG. 3, showing one typical phase of a multi-phase machine, including: relative polarities: an alternative form of the commutating transformer using a U-shaped magnetic core: an alternative form of the main field yoke using two E-shaped cores in a complementary symmetrical arrangement. In this example, the rotor coils 13 span the diameter and the stator yokes eliminate the need to conduct stator field flux across a diameter to attain a two-pole configuration, thus facilitating multi-phase machines construction. The developed winding of the arrangement is shown in FIG. 4 and it will be evident that a simpler configuration is possible, using U-shaped stator yokes.

Control of speed at constant torque capability is achieved by adjustment of the voltage across winding 11; equivalent to armature voltage control in the D.C. machine. Additionally, speed is adjusted at constant power capability by adjustment of current in winding 13, via 14, 15; equivalent to field control in the D.C. machine.

The essence of the action in the invention is that vectored, time-varying magnetic field flux is produced by selected rotor conductors or, alternatively, by separate stator winding and torque is produced by the effect of that magnetic field flux upon transverse, rotor conductors carrying induced varying current of the same frequency. In consequence of this, the power factor of the electrical load upon the main supply may be adjusted by varying the time-phase relationship between these quantities. Operating as a motor, equilibrium is achieved by the generation of back-e.m.f. in the rotor conductors, thus reducing the input power. If operated as a motor, the machine has potential for operation from switched-mode battery-fed power supplies, as well as for operation from public A.C. mains supplies, using reduced-voltage, or direct-on-line starting, together with speed adjustment above the base speed using the field power alone to achieve economy and to minimise supply harmonic currents and undesirable, electromagnetic effects. If operated as an alternator, the machine has advantages of controlled frequency, variable speed operation suited to fluctuating speed prime movers, such as wind or water mills.

In accordance with known art, whether operating as an alternating current motor or generator, conductors in the polefaces or in the rotor may be skewed relative to the axis of rotation for the purpose of reducing torque ripple or ripple in electrical output.

The embodiments of the invention so far described suffer from the disadvantage that they rely on a commutating transformer 3 which is much smaller than the rotor 12 and stator 10 combination. It is therefore thought to be very hard to generate enough torque to cause the rotor 12 to rotate.

The above description realises the invention in the most basic form. More complex and efficient ways of realising it will now be described.

Figure 5:
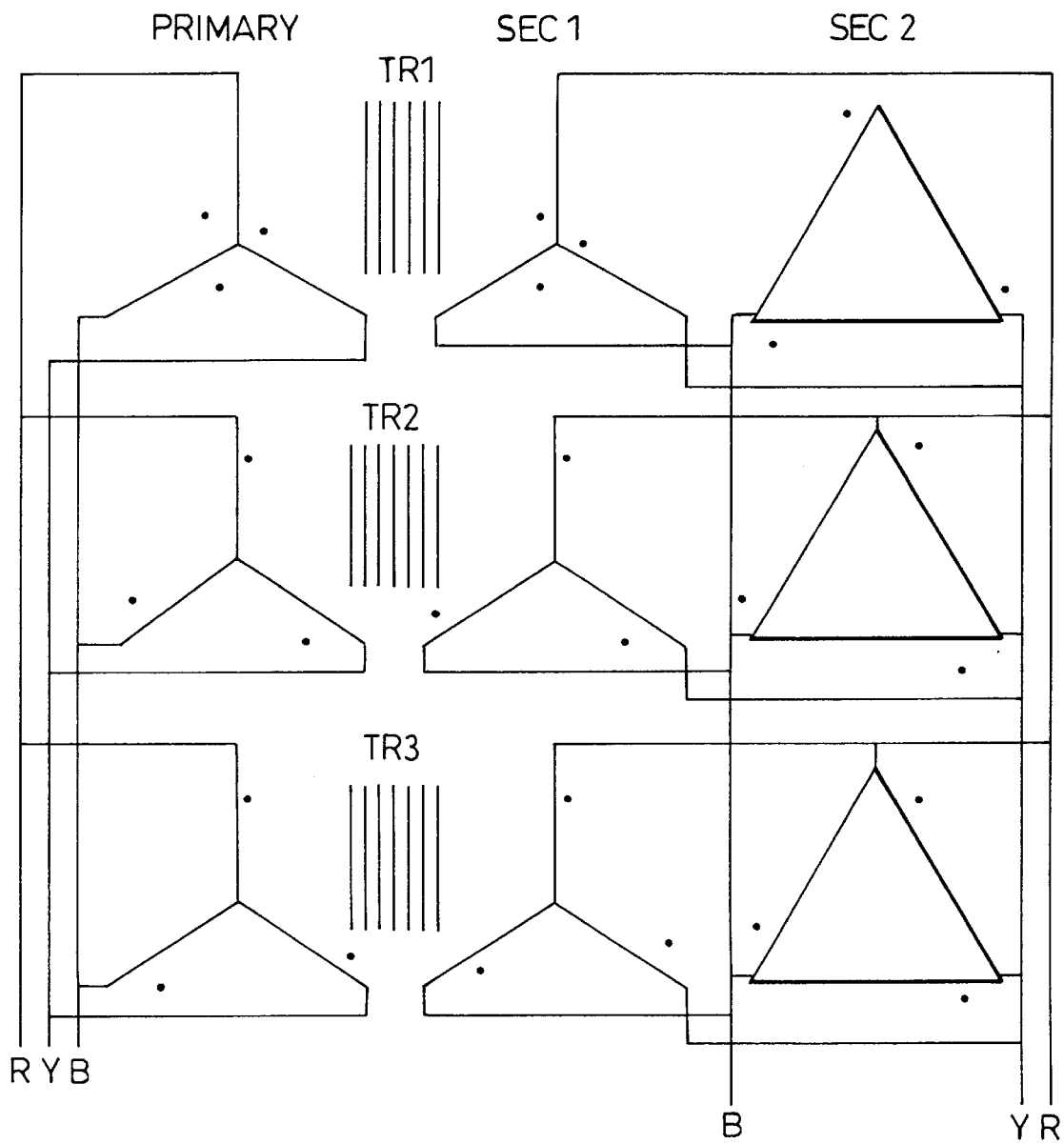
FIG. 5 shows a circuit schematic for three transformers operating in balance.

FIG. 5 shows one possible arrangement which achieves a secondary voltage balance of two, or more, transformers either with all windings connected in the same sense, or with the primary and secondary windings of any transformer, together with its magnetic fluxes, all reversed. For its purpose, FIG. 5 assumes all coils commence at the square dot, are wound in the same sense, and have appropriate numbers of turns.

Attention is drawn to the fact that because A.C. flows in all windings, all references to magnetic poles and directions of currents are instantaneous only and will change as the A.C. cycles.

FIGS. 6 to 26 show different embodiments of a rotating electrical machine. These embodiments are similar although they show different windings of a stator and a rotor of the machine. The specific structure of the device will be discussed in relation to FIGS. 6 and 7 with the notation discussed in relation to those Figures relied upon in the remainder of the description.

Figure 6:
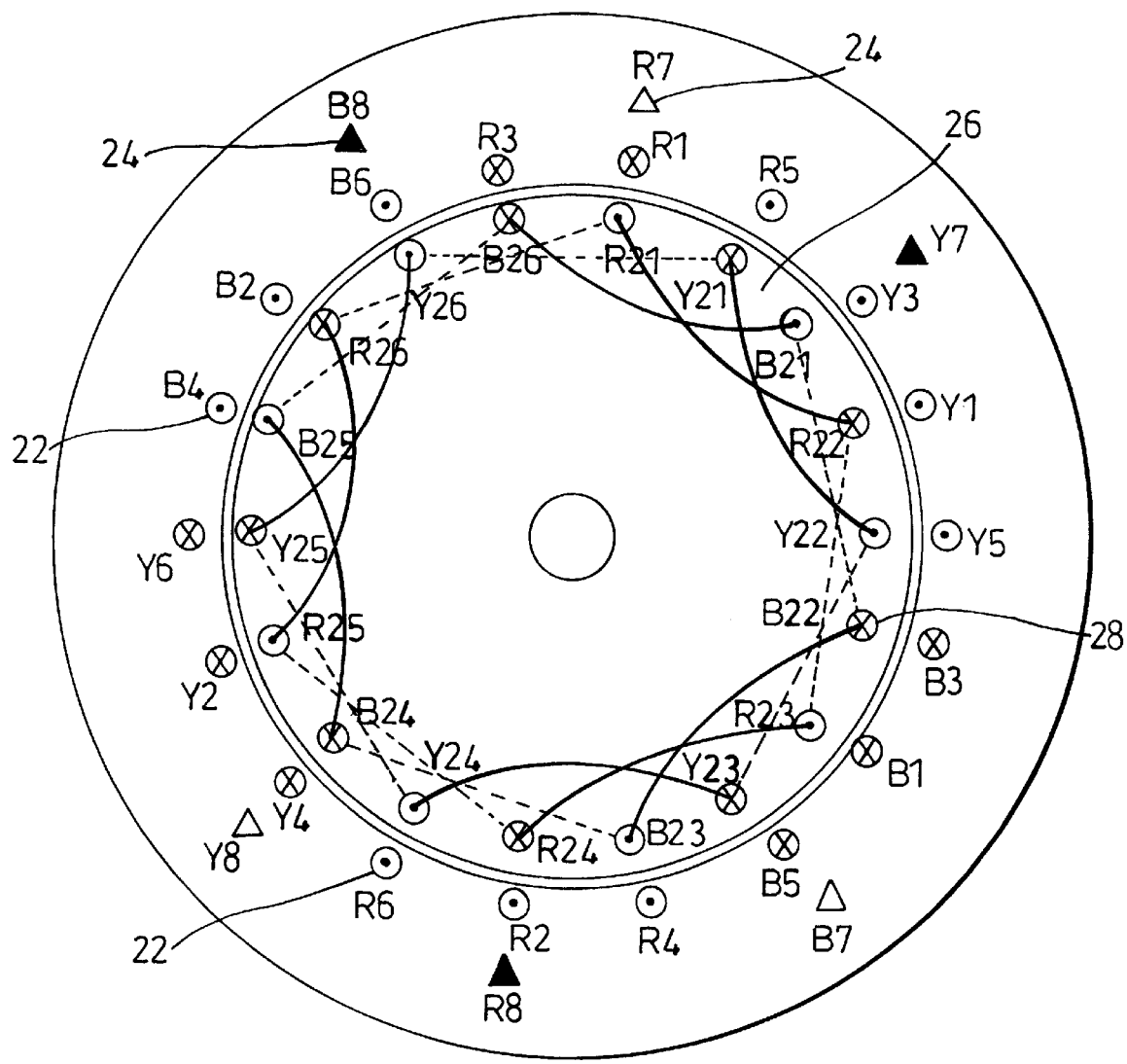
FIG. 6 shows a cross section through an a.c. motor of a second embodiment of the present invention.
Figure 7:
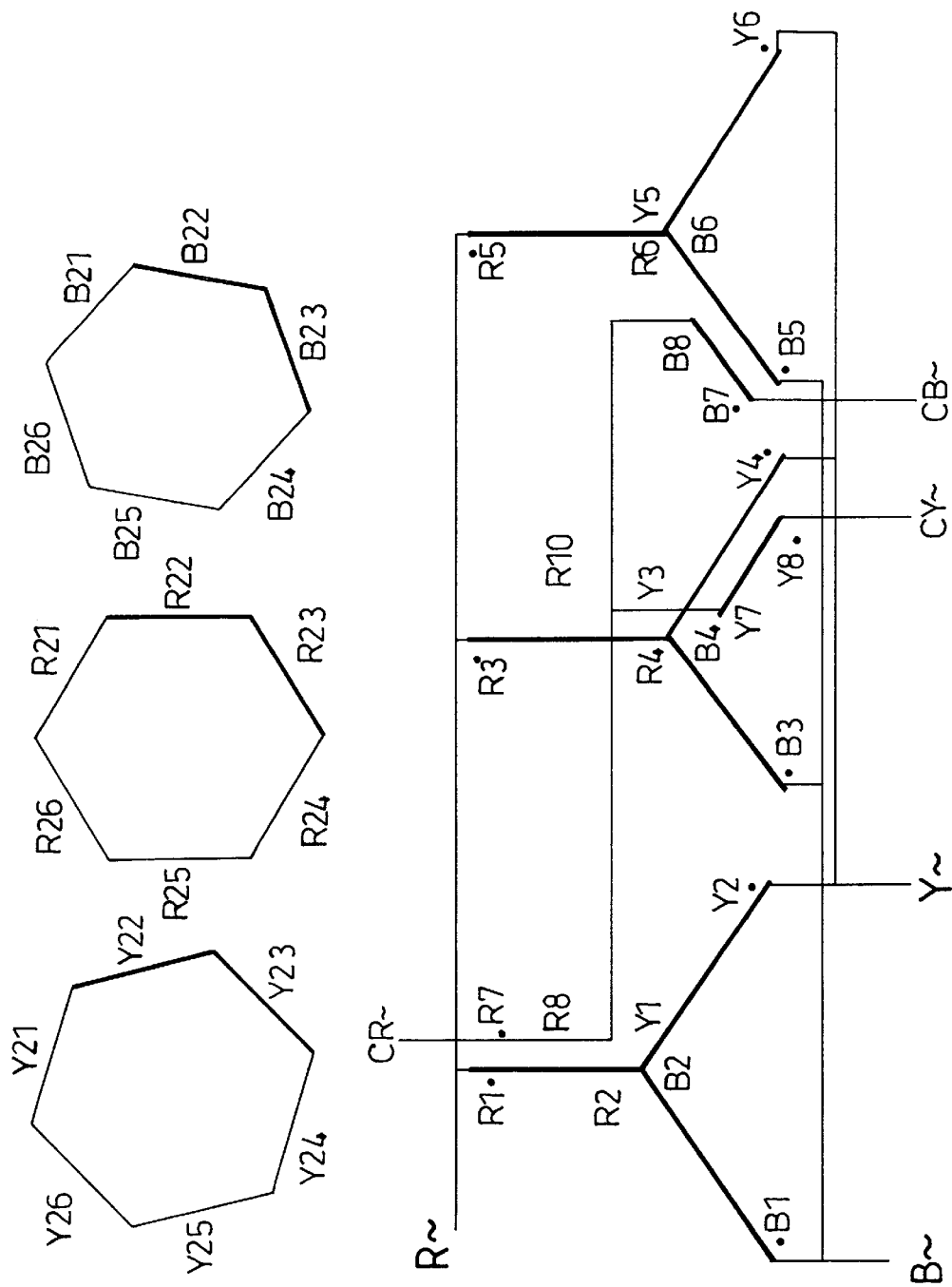
FIG. 7 shows a wiring diagram for the motor of FIG. 6.

FIGS. 6 and 7 show an embodiment of the invention which provides what is effectively two interacting transformers.

A stator 20 is provided which is of laminated steel construction. On the stator 20 there are wound a main stator winding 22 (represented by the circles around the stator 20) and a control winding 24 (represented by the triangles around the stator 20).

Within the stator 20 there is provided a rotor 26 as is known in the art. Around the rotor a rotor winding 28 is provided.

The main stator winding 22 is drawn schematically to show the sense of winding using conventional notation:⊕ showing a conductor carrying current flowing into the plane of the page and ⊙ showing a conductor carrying current flowing out of the page. Interconnection of the coils identified as R1, Y1, B1 . . . to R6,Y6,B6 is as illustrated in FIG. 7.

The location and sense of the control windings 24 identified as R7,R8,Y7,Y8,B7 and B8 on the stator are shown by the notation: ∆ meaning a conductor carrying current directed into the plane of the page and ▼ showing a conductor carrying current out of the page.

Three typical rotor windings 28 are shown and identified as R21,Y21,B21 . . . to . . . R26,Y26,B26 and using the same conventional notation as the main stator winding 22. The rotor windings 28 are zig-zag wound such that adjacent conductors are interconnected alternately above and below the plane of the page the links being shown as solid and as dotted lines respectively. Similar windings displaced from the first by a small angle would be used to improve smoothness of the action.

In use the main stator winding 22 are energised by means of a three phase alternating current supply to create rotating magnetic fields in accordance with known art but making three distinct electrical star circuits connected in parallel. For example the conductors R1,R3 and R5 will pass equal magnetising currents in the same sense and those currents will return via R2,R4 and R6 respectively. Those skilled in technology will recognise that each current path such as R1,R2 may comprise a single conductive turn or many turns connected in series to correspond with the desired operating parameters. They will also realise that a practical machine may employ practices used in known art to improve the imperfect waveform of the magnetic rotating flux such as utilising multiple layer distributed stator windings.

The stator control windings 24 are intended to be energised by an adjustable three phase alternating current supply so as to interact with and modify as desired the magnetic effects of the main stator windings.

The assembly can be regarded as a three phase transformer with primary coils R1,R2,Y1,Y2,B1,B2 arranged in balanced opposition to similar three phase transformers with primary coils R3,R4,Y3,Y4,B3,B4 and R5,R6,Y5,Y6,B5,B6 respectively and having interconnected secondaries arranged symmetrically upon a common rotor and therefore capable of commutating smoothly between transformers.

The stator control windings 24 are arranged and connected such that when energised from an electrical supply similar in phase and waveform to the main supply conductors R7,R8 increase or boost the effect of R1,R2 and similarly Y7,Y8 boost Y3,Y4 and B7,B8 boost B5,B6 to create a sustained imbalance of the rotating magnetic fields and to induce three phase alternating currents in R21,R22, R23,R24,R25,R26 with a lagging phase relationship due to the leakage reactance of the rotor windings 28. However the control winding current modifies the main field flux produced by the associated transformer phase. For example the effect of current in R7,R8 is to induce currents in R21,R22 and to circulate current from R1,R2 returning via Y2,Y1 and B1,B2. This will tend to raise the voltage across R1,R2 and to depress that across Y2,Y1 B1,B2 due to leakage reactance in these circuit elements. Therefore the magnetisation will be similarly affected and will cause increased imbalance of the magnetic fluxes associated with the transformer phases. This effect is particularly relevant to super-conducting windings which can minimise the losses due to high circulating currents and can therefore allow radical dynamic adjustment of the voltage vectors and associated magnetic fluxes by moving the local electrical and magnetic neutral as depicted in the vector diagram FIG. 10. Another aspect which becomes relevant in such a case is that the absence of rotor resistance ensures that rotor currents induced by R7,R8 will be either in-phase or in anti-phase with the magnetic flux produced by R1,R2 and therefore with the e.m.f. induced by motion of these conductors through the flux.

Figure 8:
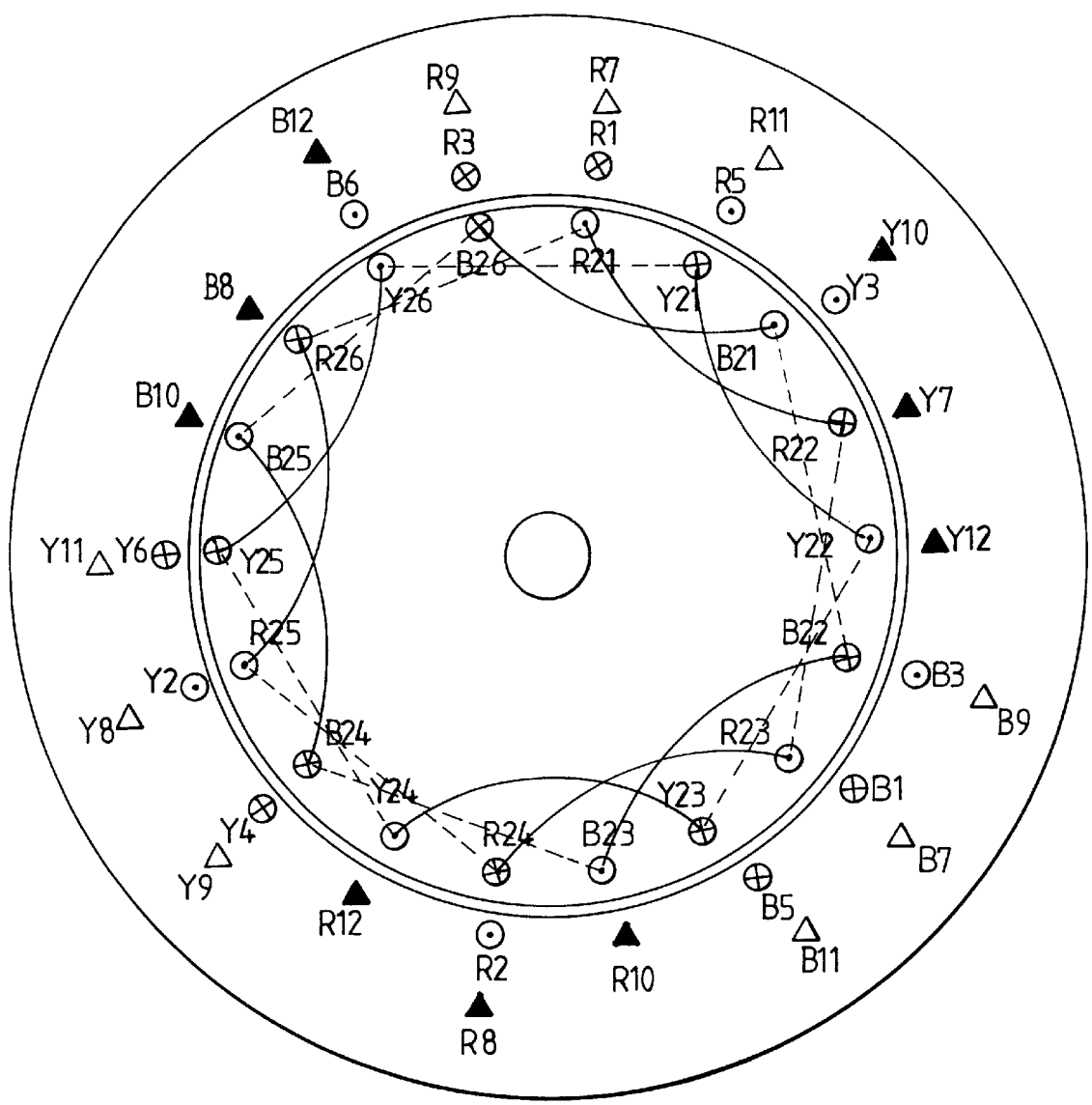
FIG. 8 shows a cross section through an a.c. motor of a third embodiment of the present invention.
Figure 9:
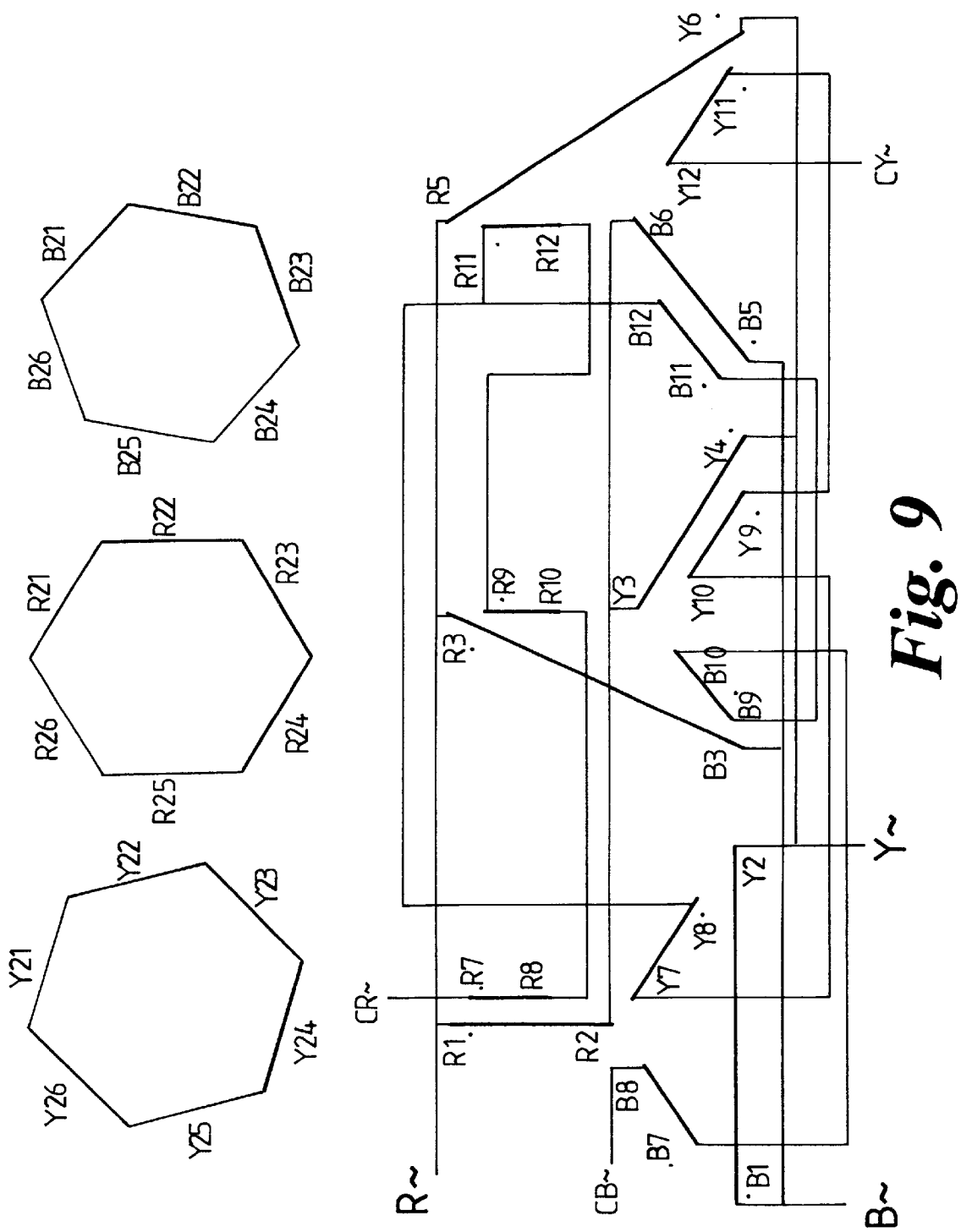
FIG. 9 shows a wiring diagram of the motor of FIG. 8.
Figure 10:
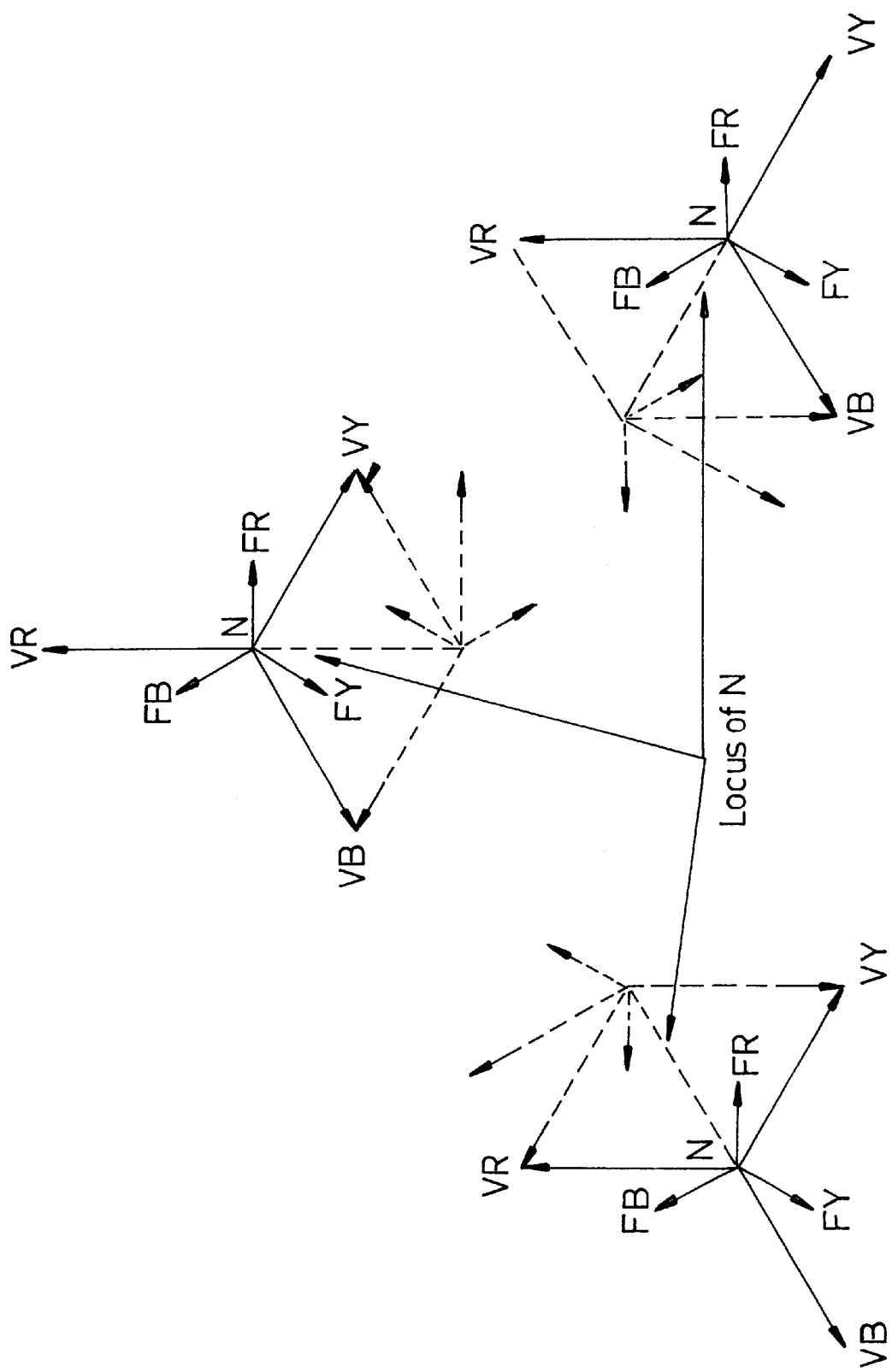
FIG. 10 shows a vector diagram for the motor of FIG. 8.

Those skilled in the art will realise that ordinary windings possessing resistance can approximate to super-conducting windings in this respect provided the rotor leakage reactance is made suitably high. They will realise also that the control can be enhanced by adding complementary control windings in series with for example R7,R8 which buck by 50% each the effect of R3,R4 and R5,R6 and similarly for the other phases. Thirdly, they will realise that the two main stator winding elements associated in each star with these additional control windings can be replaced by one appropriate element of an equivalent delta winding. This arrangement is shown in FIG. 9. It then becomes clear that any imbalance in the ampere-turns of this delta element and the rotor winding which is magnetically coupled to it will directly affect the magnetisation of the transformer primary element R1,R2 so as to counter the imbalance. Symmetry of the construction is therefore an essential ingredient of the modified arrangement which is shown in FIG. 8. This joins three complementary sub-sets of elements and has the symmetry needed to permit rotation of the rotor and therefore a satisfactory larger arrangement requires that at least one pair of such complete systems are constructed in complementary symmetry upon the same rotor and stator by making use of a suitably wound and cross-linked rotor using a coil span of one pole pitch or more which achieves the necessary rotor circuit by linking only pairs of equi-potential points across any rotor diameter or by linking none and therefore is electrically stable in all angular positions. In this form the rotor and stator must each have at least eighteen slots to achieve the necessary symmetry. Multiples of this completed scheme are possible in order to increase the number of effective poles of the machine.

The back-e.m.f. components due to motion of the conductors R23,R24,R25,R26 will resolve to a single e.m.f. component in-phase with that of R21,R22, plus one which is in quadrature implying some extent of possible interaction with the supply to R7,R8. This will modify the circulating currents and the balance of voltages across R1,R2 B1,B2 and Y1,Y2 and thereby result in the delivery of single-phase power to or from this segment of the machine. By similar action in the remaining segments there will be an equivalent transfer maintaining balance of currents among the three phases of the supply.

By simple analogy with the action of conventional induction motors it will be evident these currents will result in a torque tending to accelerate the rotor 26 in the same direction as the rotating magnetic fields but with the important differences that the torque can be controlled by the current in the stator control windings 24 and that rotation of the rotor 26 will reduce the speed difference from the rotating field until a dynamic balance is achieved which can just sustain rotation against the mechanical load. Power input must then be increased by raising the control supply voltage and therefore speed can be controlled by this adjustment. The main stator windings 22 are analogous to the shunt field of a DC machine and the control stator winding 24 equates to the DC machine commutator and brush gear which inserts electrical power in the appropriate manner. If the mechanical load drives the rotor 26 speed above the balance condition then the currents in the rotor winding 28 and control windings 24 will reverse and the machine will generate electrical power into the control supply. The action is analogous to that of the shunt wound separately excited DC motor.

The possibility mentioned above of radical adjustment of the magnetic fluxes around certain conductors suggests the use of a similar machine with stationary rotor or with combined stator and rotor so as to achieve an electrically adjustable electrical power transformer. In such a case the lack of continuous rotation makes it possible also to consider incorporation of magnetic components fabricated from materials other than steel laminations.

Figure 11:
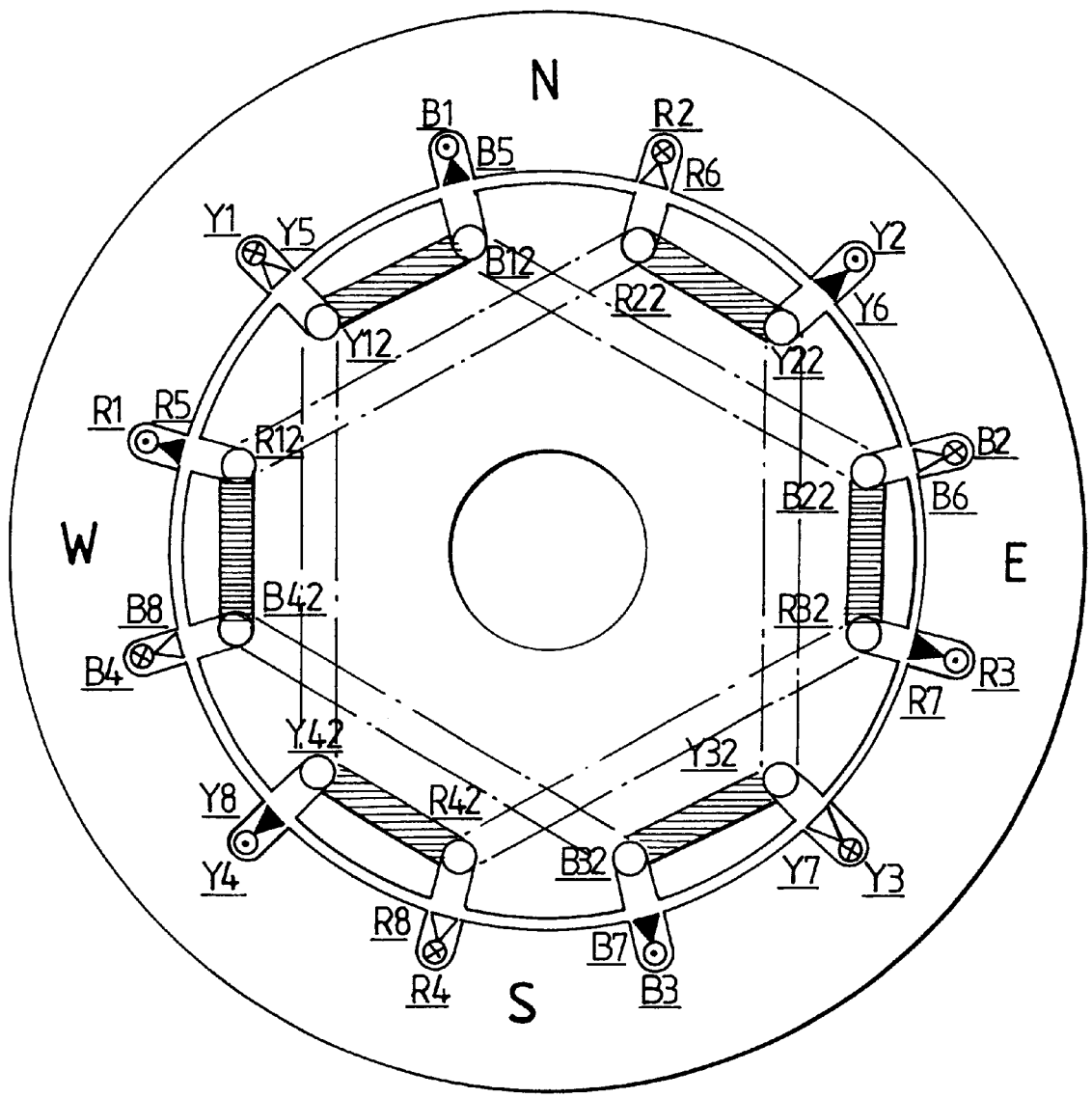
FIG. 11 shows a cross section through an a.c. motor of a fourth embodiment of the present invention.
Figure 12:
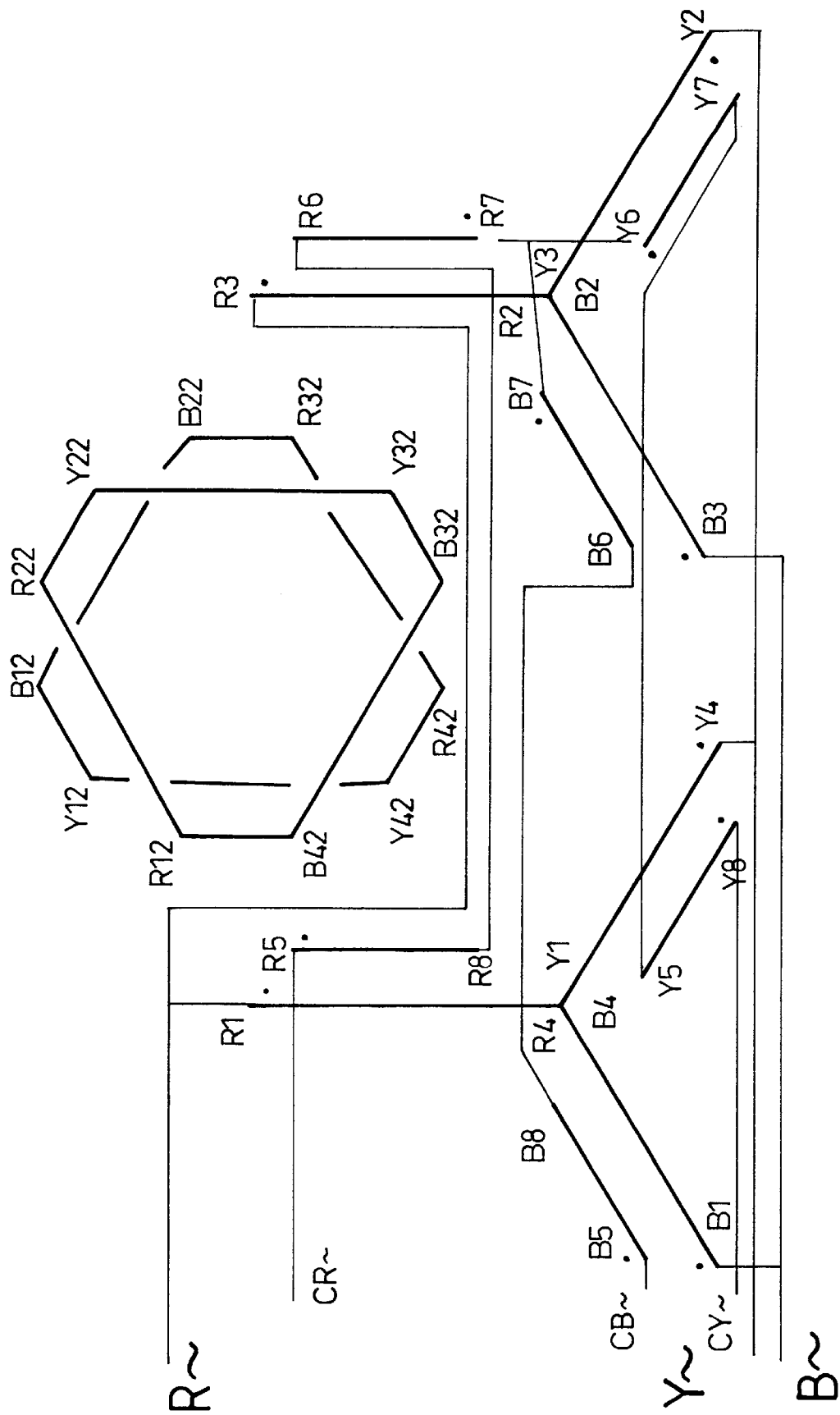
FIG. 12 shows a wiring diagram of the motor of FIG. 11.

In the example in FIG. 11 Y1,Y4,Y5,Y8, etc., have the polarities shown and R1-Y1-B1 to R4-Y4-B4 are configured as two, star, three phase circuits as shown in FIG. 12 which have balanced effects on the rotor so as to produce rotating magnetic fields but no induced current in the rotor winding 28, because the windings are phased 120 electrical degrees apart. The main stator windings 22 could, of course, be arranged equally validly as two delta circuits. Because similar phases are diametrically opposed, equal magnetic poles are diametrically displaced, and for rotation, either the currents in conductors under the same phase must be in the same direction, or at least there must be a nett imbalance of opposing torques. Considering that the vector sum of effects of the R & B poles is equal and opposite to Y, when balanced, it is evident that by linking the fully pitched coils Y32,Y22; R42,R32; B22,B12 to form a delta circuit and Y32,Y22; R22,R12; B42,B32 to form a complementary, delta circuit in the rotor 26, then there will be no nett induced current in the rotor winding 28 when the stator ampere-turns are balanced, but there will be a predictable flux pattern which can be locally distorted without altering the total. For example, by unbalancing the two, three-phase main stator windings 22 in a complementary way, e.g. superimposing ampere-turns boosting R4,Y4: B4,R1: Y1,B1 and bucking (reducing) R2,Y2: B2,R3: Y3,R3, the rotor induced e.m.f R12,B42 will be equal and opposite to the vector sum of B12,Y12+Y42,R42 and currents in say conductors R12 and R32 must flow in opposite directions, giving nett, single phase currents in the rotor winding 28 lagging behind the currents flowing in the stator winding 22, Y phase by a phase angle depending on rotor leakage reactance. Although these currents are equal and opposed, the magnetic flux components which determine them are necessarily unbalanced in magnitude and phase, resulting in a nett torque, together with substantial, cyclic, radial force against the rotor bearings, which is decreased as the flux imbalance rises. The point where flux reaches zero in one set or windings is one limit of the useful imbalance for this configuration, because conductors in the same, delta, rotor winding 28 will thereafter be subject to increasingly uniform fields of one polarity. The rotor windings 28 shown in FIG. 12 may be alternatively configured as distributed windings, or may be interleaved by similar, independent windings each occupying six slots.

Notation for the stator main windings, stator control windings and rotor windings is the same for FIGS. 8 to 26 as in FIGS. 6 and 7.

Figure 13:
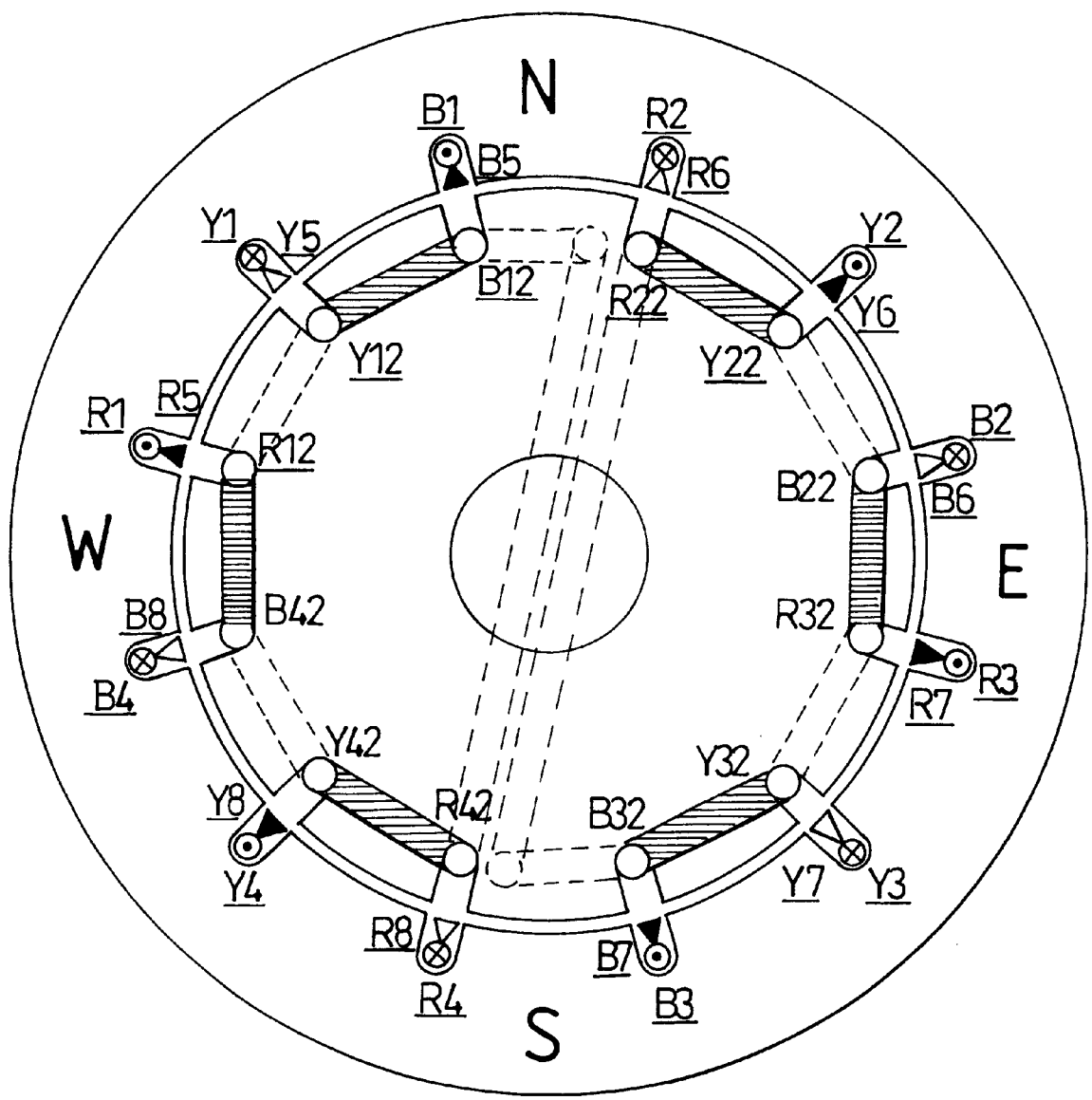
FIG. 13 shows a cross section through an a.c. motor of a fifth embodiment of the present invention.
Figure 14:
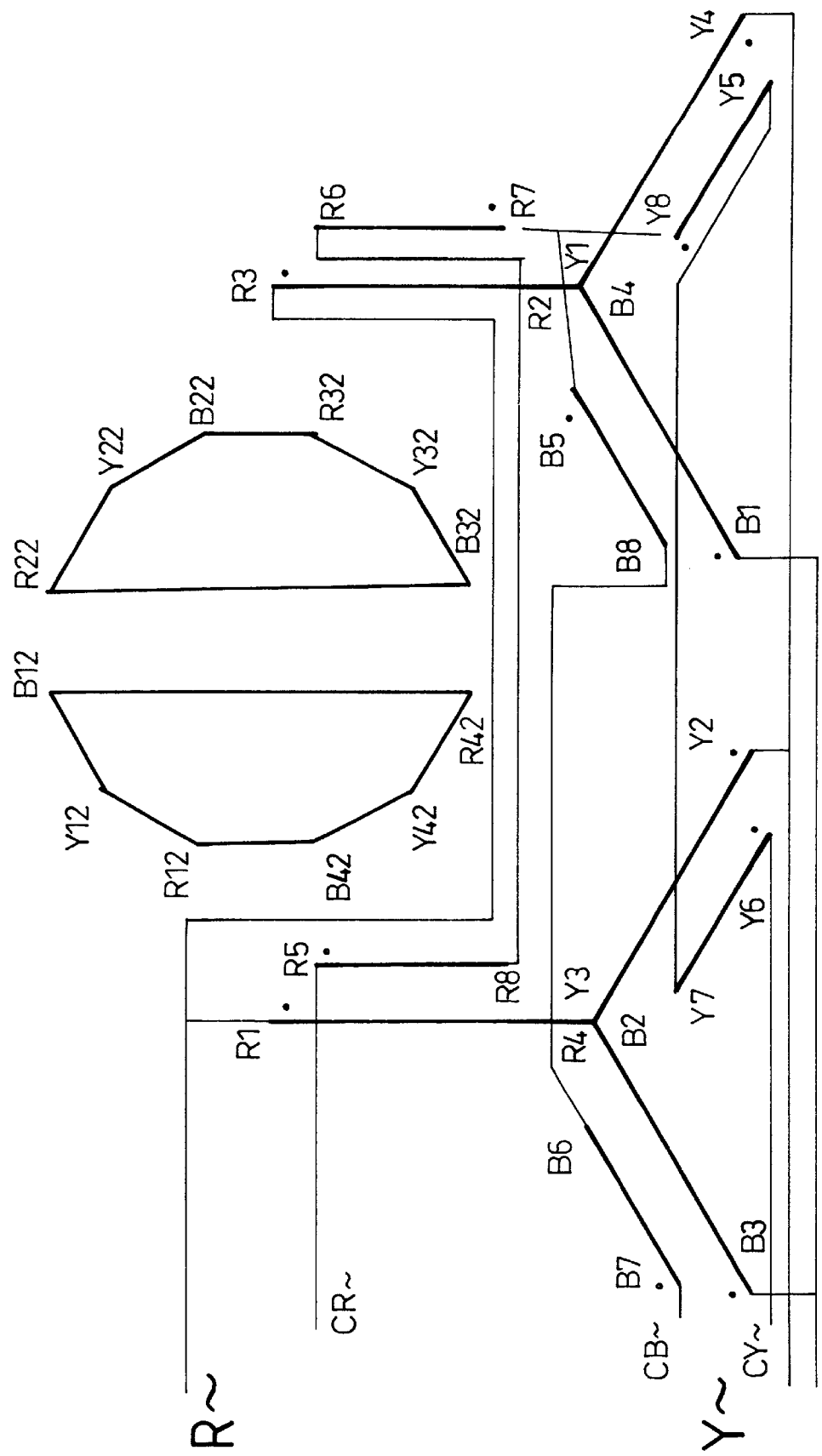
FIG. 14 shows a wiring diagram for the motor of FIG. 13.

Similar considerations apply if the rotor winding 28 is formed as a multiplicity of independent, fully-pitched coils forming triads, typically arranged as the pair shown in FIG. 13, which also may be configured as a distributed winding occupying a multiplicity of rotor slots within half the rotor circumference, or may be partly overlaid by independent, similar windings to obtain phase-shifted circuits which produce continuity of action at all positions of the rotor. The circuit of this example is shown in FIG. 14.

Figure 15:
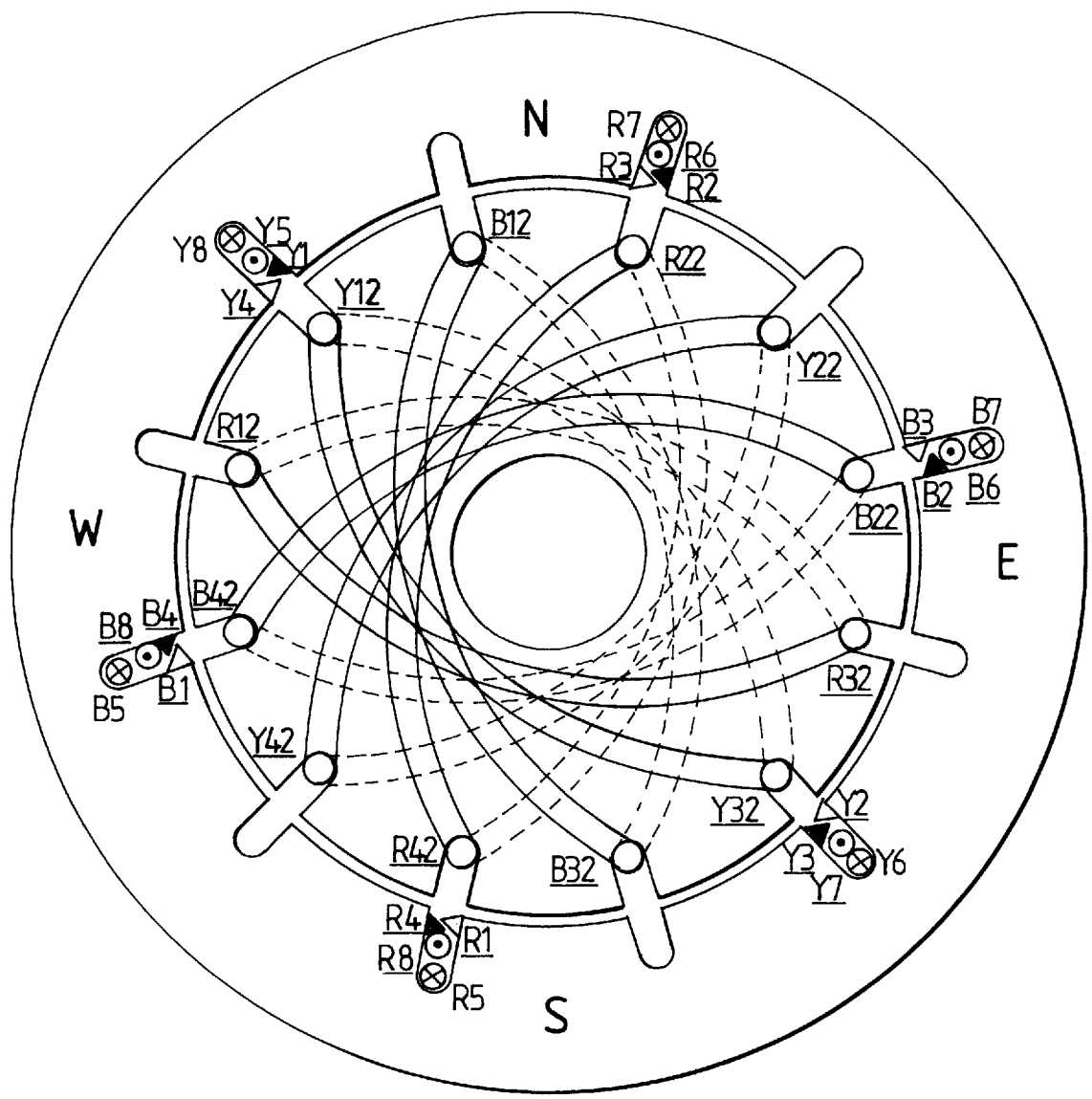
FIG. 15 shows a cross section through an a.c. motor of a sixth embodiment of the present invention.
Figure 16:
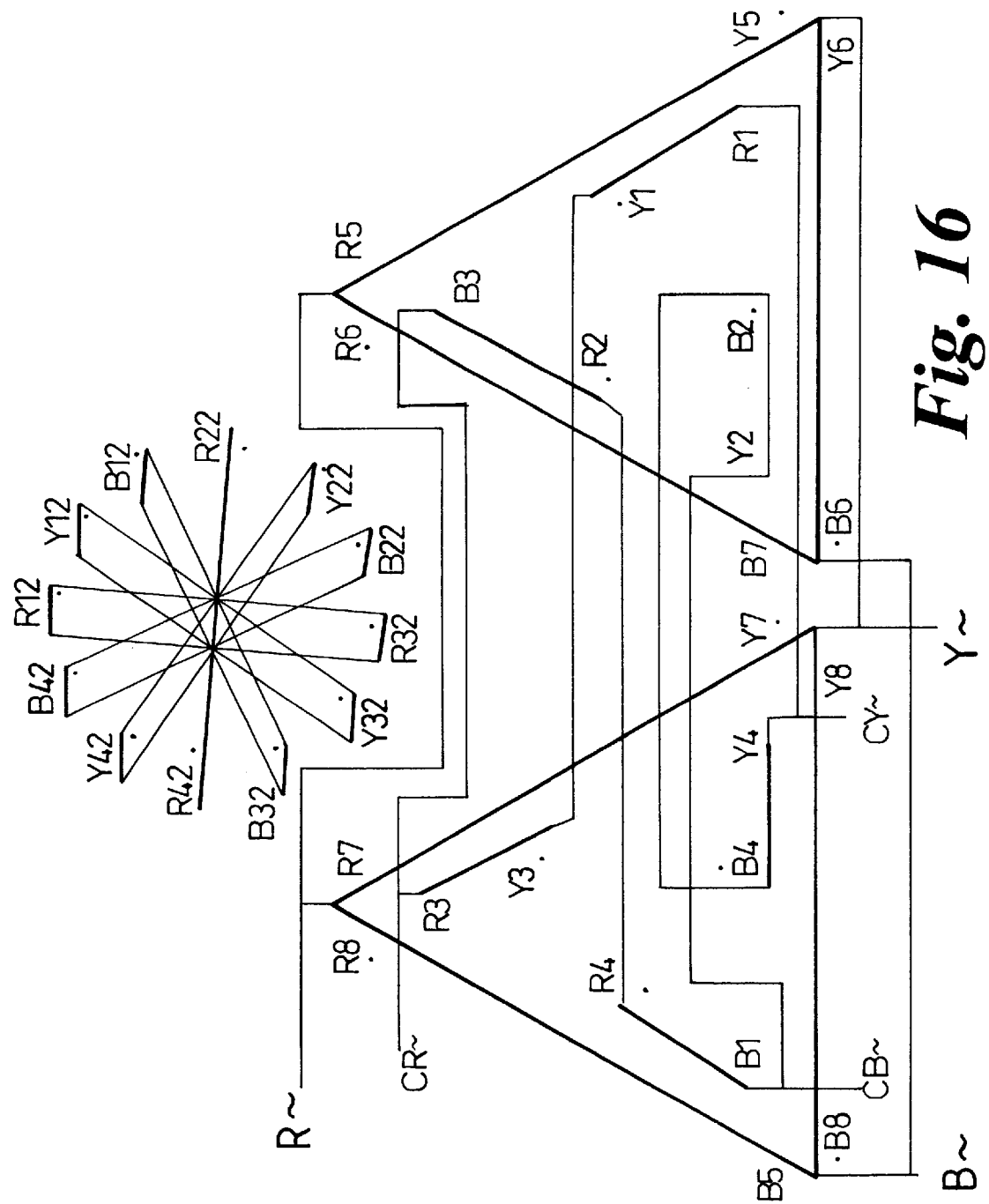
FIG. 16 shows a wiring diagram for the motor of FIG. 15.
Figure 17:
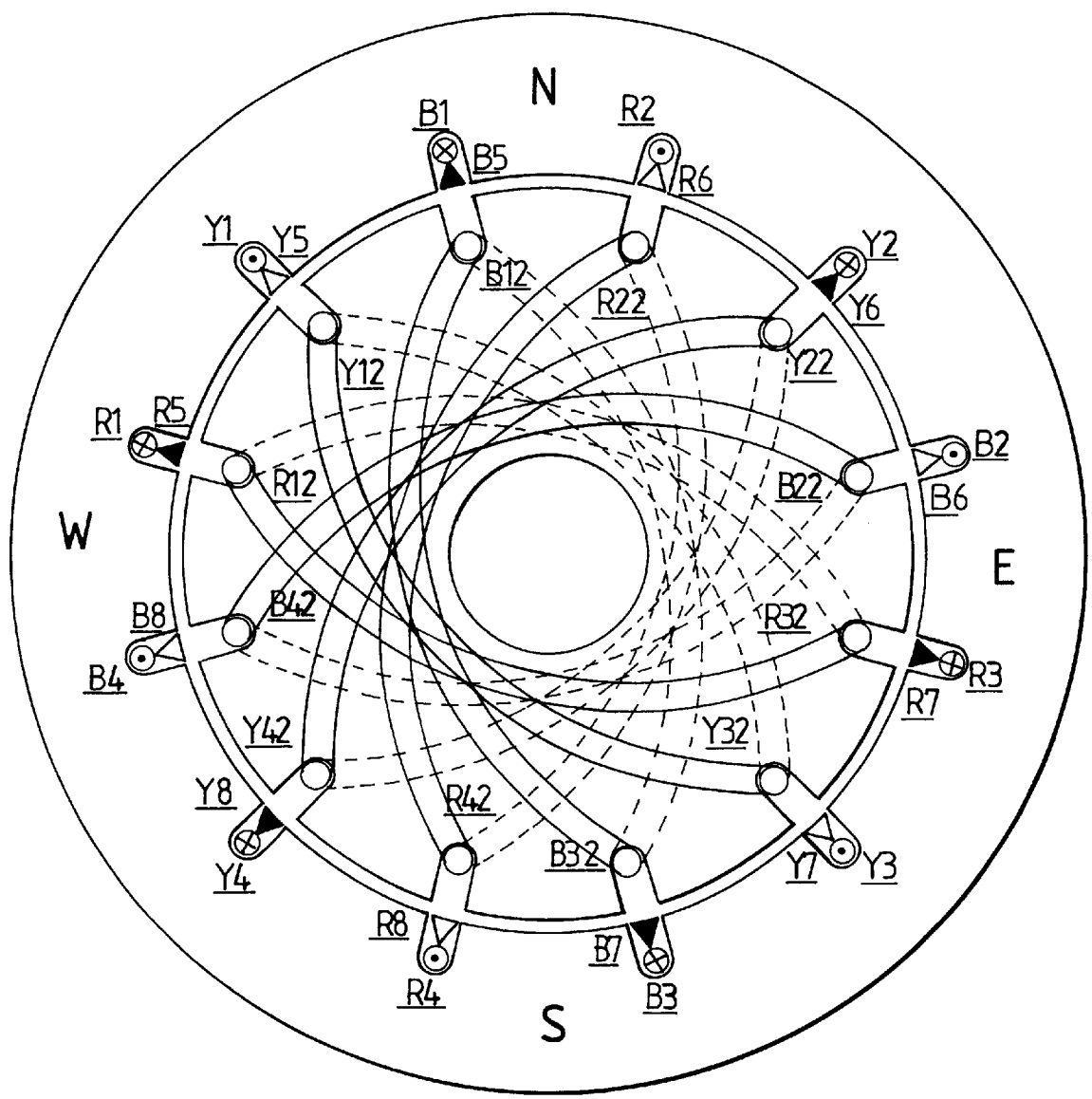
FIG. 17 shows a cross section through an a.c. motor of a seventh embodiment of the present invention.
Figure 18:
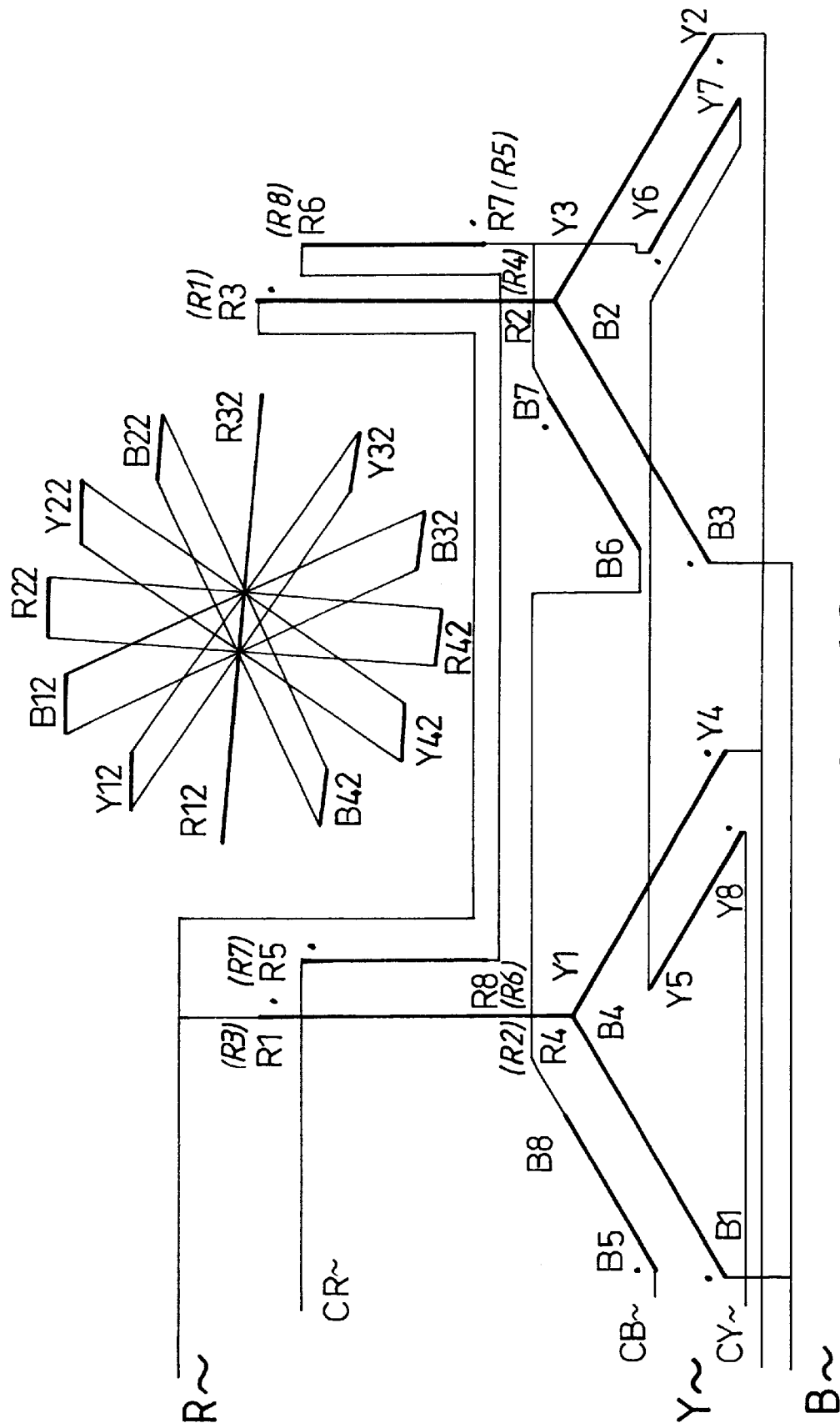
FIG. 18 shows a wiring diagram for the motor of FIG. 17.

FIG. 15 shows a wound rotor in an arrangement permitting single phase rotor currents, in each of 6 independent, single or multi-turn closed circuits. The circuit is depicted in FIG. 16, in which each leg of the stator, delta windings produces only a fraction of the maximum R.M.S. flux density, when the rotor is at standstill, to enable the delta-connected buck-boost windings to circulate the load current components in the delta transformer primaries and the shared secondaries which form the rotor windings. FIGS. 17 and 18 show a version with star-connected stator windings.

Figure 19:
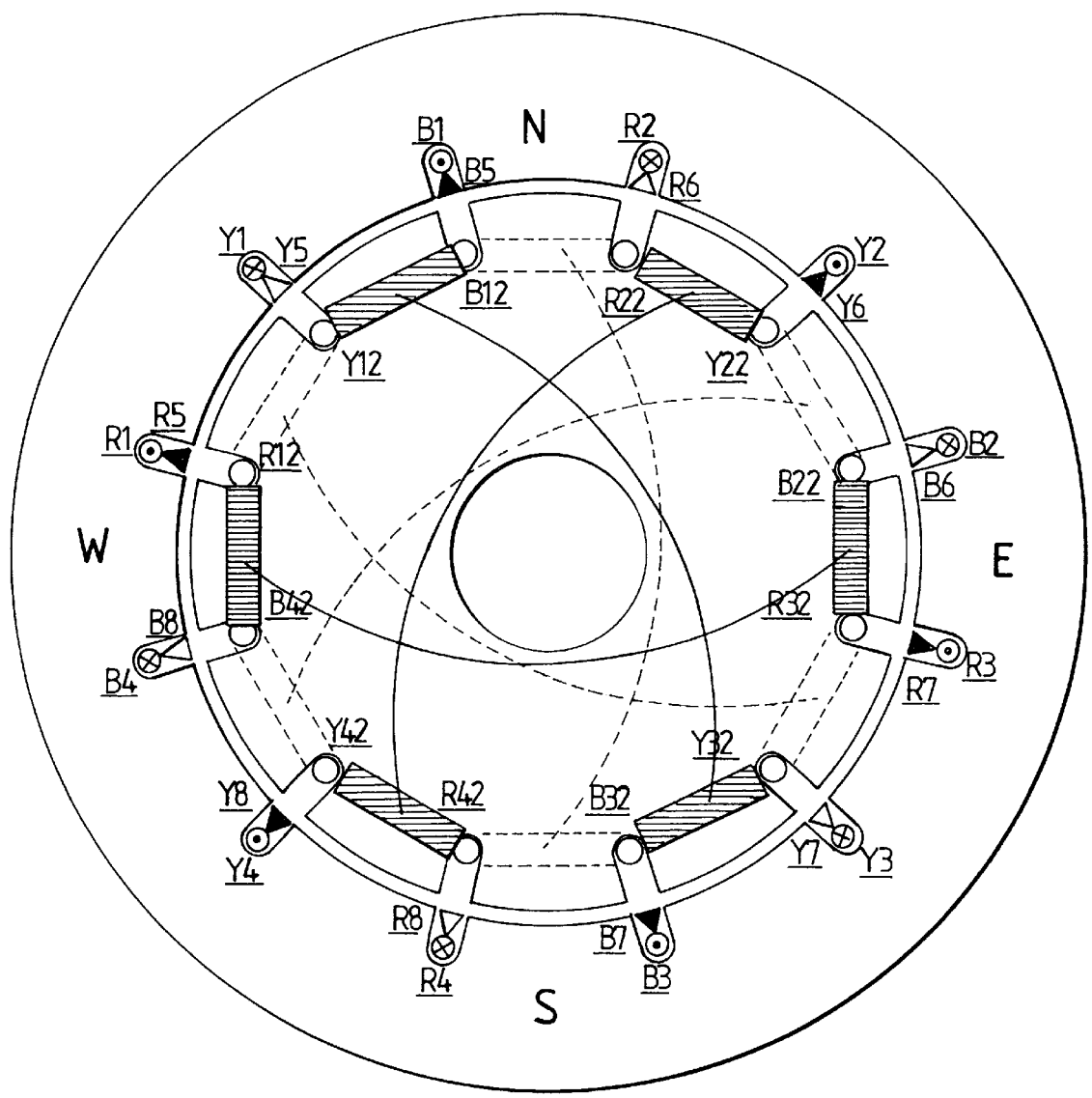
FIG. 19 shows a cross section through an a.c. motor of a eighth embodiment of the present invention.
Figure 20:
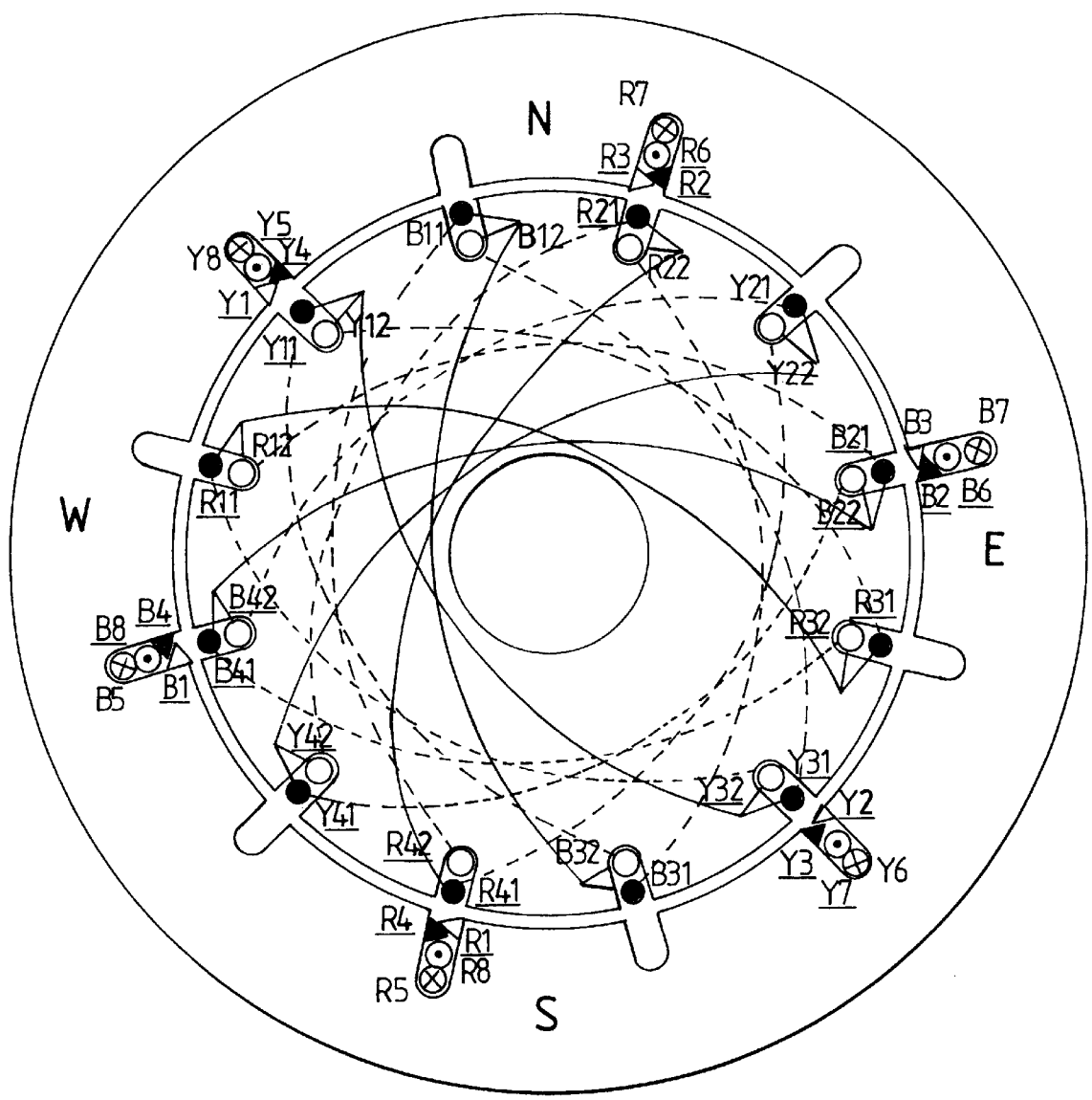
FIG. 20 shows a cross section through an a.c. motor of a ninth embodiment of the present invention.

FIG. 19 and FIG. 20 show the further alternatives of zig-zag and of short-chorded continuous, rotor windings, respectively, both of which are diametrically cross-linked to form dynamic, double-delta configurations. The zig-zag rotor winding of FIG. 14 equates to a continuous winding having coil-span of one pole pitch. The winding in FIG. 20 has a coil-span of five slots as shown by the dotted curves.

These variations require an associated change to the arrangement of stator, control windings. Whereas FIG. 11 requires that magnetic imbalance is created between windings in sector NWS and those in sector NES, for example, the imbalance in FIG. 13, FIG. 19 or FIG. 20 requires that R1,R4; Y2,Y3; B1,B4 are bucked or boosted in comparison with R2,R3; Y1,Y4; B2,B3. In this case, the flux imbalance produces nett torque, together with potentially large forces between conductors of the same winding.

Because it has only simple rotor circuits, the arrangement shown in FIG. 17 can operate with either pattern of imbalance, by swapping the connections to the R windings as shown by the labels in parenthesis, in the circuit FIG. 18.

For the rotor illustrated in FIG. 20, increments of 30 degrees rotation would cause identical relationships between the active conductors and by adding interleaved coils, the increment would be reduced. Thus, for a fully distributed rotor winding with many diametric links, the effect of relative position of the rotor upon the perceived, transformer double delta secondary circuit can be made insignificant. Similarly, in FIG. 15 the number of rotor slots can be increased and individual rotor coils can be distributed over an angular zone, or the number of independent coils could be increased, to reduce torque ripple or circuit dependence upon actual, instantaneous position of the rotor.

Figure 21:
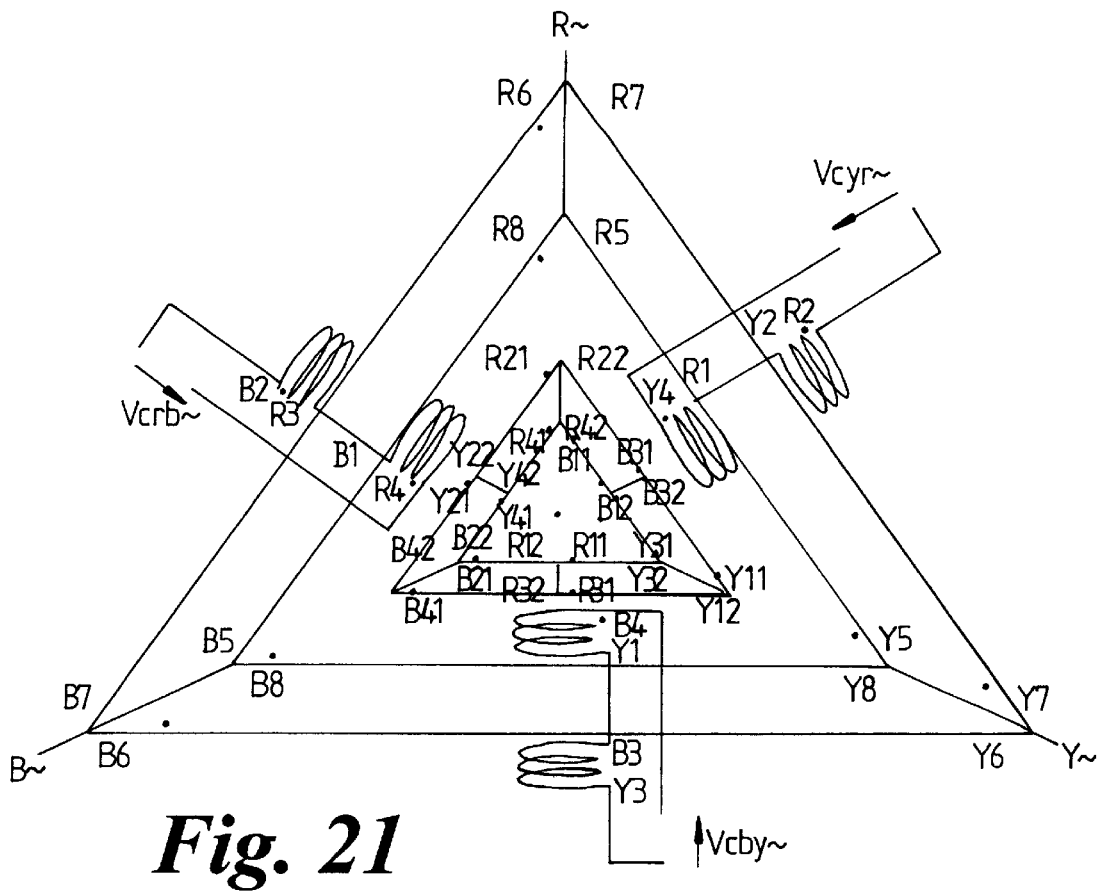
FIG. 21 shows a schematic diagram of the wiring of the motor shown in FIG. 20.
Figure 22:
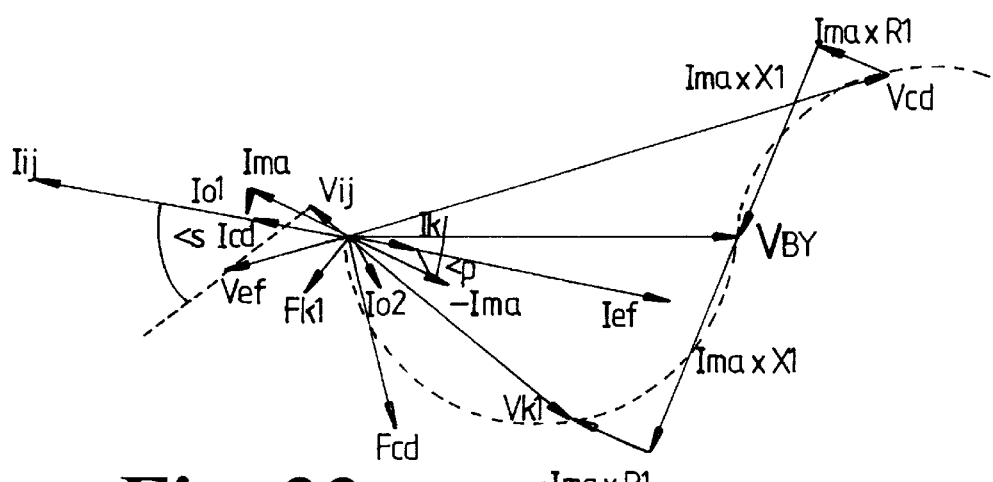
FIG. 22 shows a vector diagram for the voltages and the currents in the motor of FIG. 20.

By way of further example only, consider FIG. 21 and FIG. 22 which show in schematic form the connections and a vector diagram of various electrical and magnetic quantities associated with the B~Y~ supply lines and the R~ control phase, in the machine depicted in FIG. 20, having delta stator windings. Nodes a,b,c,d,e,f,i,j,k,l,m,n relate to the equivalent circuit in FIG. 23. For clarity, this is restricted to show only one phase of the three phase network. Transformer fluxes Fcd, Fkl lag voltages Vcd, Vkl by 90 degrees, respectively. Control fluxes FC, −FC are differential and substantially in phase or in opposition with these transformer fluxes, because the control windings are delta connected. At standstill, the differential control flux and associated circulating currents are available to provide starting torque. Moreover, the circulation of relatively large currents through the primary leakage reactance will swing apart the transformer flux vectors and cause additional components of secondary current and starting torque. As shown typically, in the simplified diagram FIG. 24 there will immediately be induced, e.m.f's. in proportion to the flux component vectors and the speed of the synchronously rotating flux past the rotor conductors, inducing differential currents, lagging the e.m.f's. by the rotor phase angle. Therefore, the associated secondary fluxes will contain components opposing the control flux, but will also contain quadrature components which reinforce the differential imbalance of transformer fluxes and resulting main currents, producing slip-related amplification of the control action.

Figure 23:
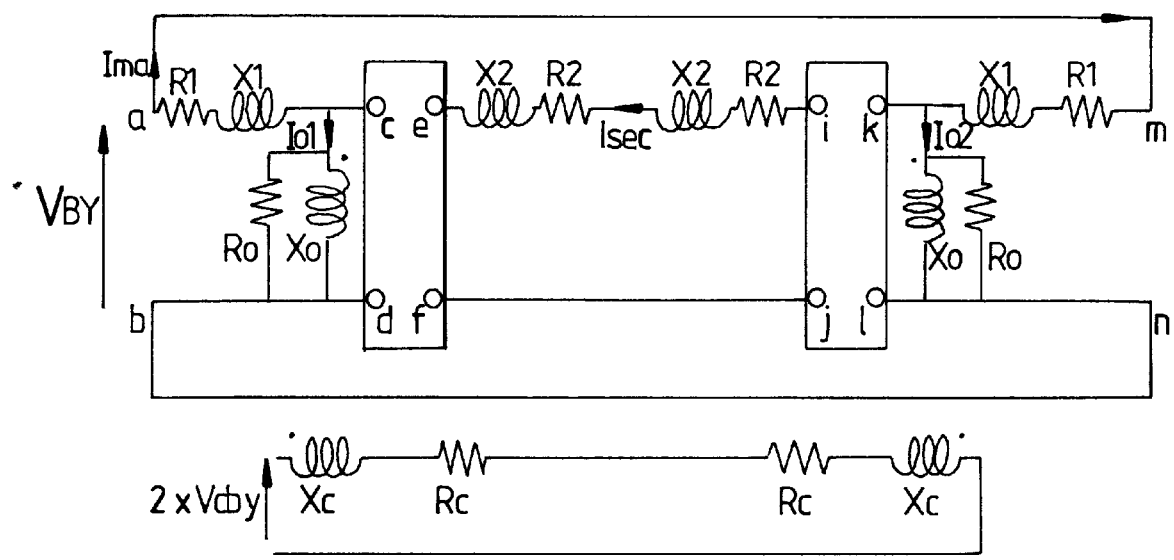
FIG. 23 shows an equivalent circuit for the motor of FIG. 20.
Figure 24:
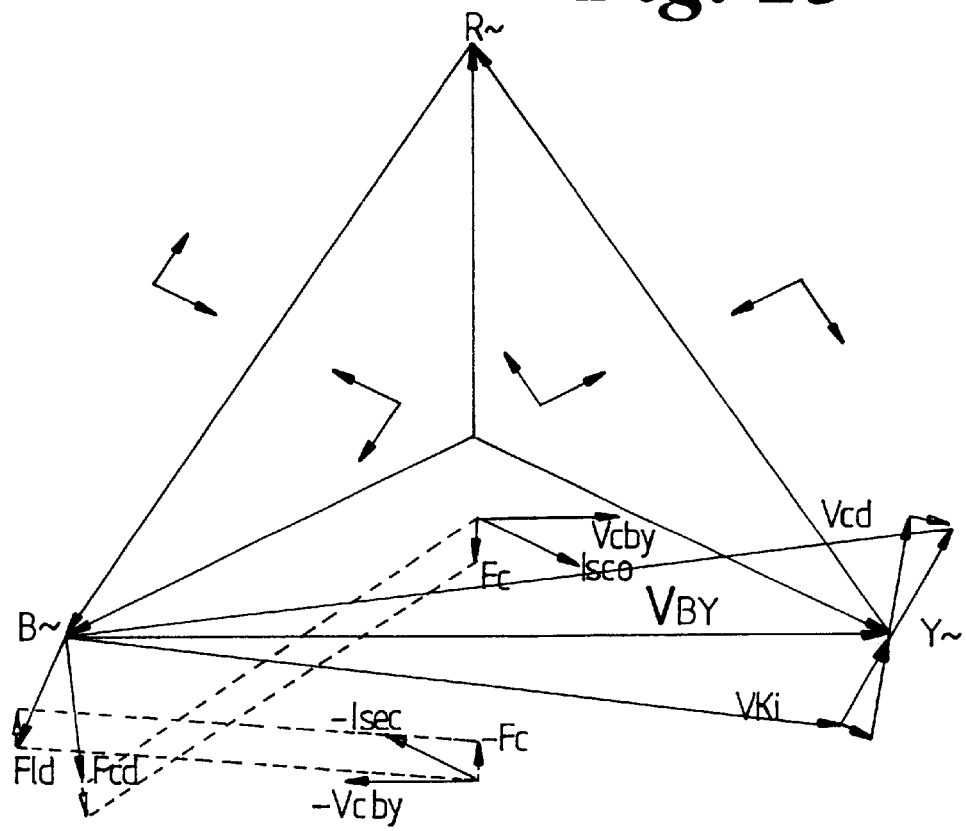
FIG. 24 shows a further vector diagram for the motor of FIG. 20.

It may be that the various configurations are not equally useful, but at all events, it has been shown that a multiplicity of rotor winding arrangements are capable of being configured, with related stator windings to give controlled performance, using the same operating principle. In all cases, the stator field windings provide transformer primaries which allow the initial, controlled recirculation of current as well as providing main field excitation. The control winding must drive current round each single phase rotor circuit against the back-e.m.f. resulting from motion. As the speed increases, in order to maintain constant torque, the magnetising current imbalance must be progressively increased, to provide the driving e.m.f. Otherwise, the rotor current will progressively reduce to that value which can just sustain rotation against the load and the machine will then be running as an induction motor, with appropriate slip. Therefore, if each transformer was initially at flux θ, then throughout this part of the control range it can maintain virtually the same total flux 2θ, but because the balance shifts to suit speed, the machine has a naturally rising, sustained torque characteristic. The end of this range is marked by zero flux in one transformer, its primary magnetising voltage having been wholly backed-off by the control winding, but this is not the end of the possible control range, because by further imbalance, the sense of the fluxes in that transformer can be reversed, producing additive torque components in this portion of the speed range of configurations of FIGS. 15, 19 and 20. The simplified circuit diagram is shown in FIG. 23. Significantly, the main load current flows into the underexcited transformer and further reduces its primary voltage, which supports the action of the control winding. This may be designed with any ratio including equal numbers of turns and conducts largely reactive, circulating current, which offers the possibility of including the control winding in a parallel resonant, power circuit so that the machine functions as a high gain, control current amplifier. In any particular application, the optimum turns ratio may not be 1:1 because there may be advantage in applying sufficient magnetising control current to reverse the polarity within the underexcited transformer and increase it in the opposite direction so as to enhance the torque. At this stage, the number of effective poles is half of the total. Depending upon the initial flux densities, the over-excited transformer may become saturated, thus complicating the control characteristic.

For low technology applications, there is also possibility to apply magnetic imbalance to the preceding configurations by mechanical means, such as gradually inserting or withdrawing iron in pre-arranged core apertures, so as to make minor speed alterations.

The machine can operate as a generator. If the control windings are excited by a fixed frequency, three phase supply and the rotor is driven by some external prime mover, then electrical power will be generated at the control frequency, but at a voltage dependent upon the rotor speed and the control flux magnitude. The generator may therefore readily be designed to deliver load current at constant voltage and frequency, despite speed variations of the prime mover, always provided it develops adequate mechanical power to sustain operation. As a generator, the machine can, in principle, operate super-synchronously, or sub-synchronously and therefore can be arranged to suit a wide variety of prime movers and to achieve high specific output.

A number of theoretical and practical advantages can be ascribed to a machine of such design.

It offers adjustable speed operation, with direct-on-line, soft starting at standstill and with high, short-term overload torque capability, from a fixed frequency, three phase, alternating current mains supply, without need of electromagnetically noisy or complex, high power control systems.

It offers high reliability because it incorporates neither commutators, sliprings, nor electrical brush-gear, except as may be required for earthing the rotor assembly to satisfy statutory safety, or protection criteria.

It is a magnetically closed, three phase, balanced system, offering scope to minimise any generated electromagnetic interference.

Runaway under internal fault conditions cannot result in motoring at higher speed than synchronous speed.

It can take advantage of the improved control and/or higher frequency operation offered by incorporation of electronic or other inverter type power supplies.

If used with an electronic type of inverter for control enhancement, but with the stator connected to the mains supply, for fixed frequency operation, then even at high power ratings, by using the inherent current amplification and overload capacity of the machine, it can provide high response, motoring or regenerative capability.

It can be powered from battery-fed electronically generated three phase supplies which, together with its high overload capacity, should enable it to satisfy many traction applications, without need of change-speed gearboxes.

It offers potential to use a simple arrangement of heavy-current, low-voltage, continuous, rotor conductors, which could be made very robust to suit high speeds, for test rigs or turbo-generator applications, or could be tubes permitting relatively simple, direct cooling, possibly including supercooling, for high efficiency operation, or compactness.

It is inherently suitable for unidirectional operation as either a motor or a generator, at any speed within the operating range and may be simply reversed, by swapping any two of the three line connections to the mains supply, thus reversing the phase sequence.

Multi-pole versions of the configuration may be used within one machine, to achieve enhanced performance where required; for example in large, slow speed, hydro-electric generators.

Other configurations of this design alternative are possible, including both linear thrusters, formed by 'unrolling' the design onto a flat plane, and rotary versions with axially displaced stators acting on either the periphery, or the radial faces of a single rotor.

Alternative Two

To recapitulate, as depicted in FIG. 5, it is possible to achieve a secondary voltage balance of two, or more, transformers either with all windings connected in the same sense, or with the primary and secondary windings of any transformer, together with its magnetic fluxes, all reversed. Alternative one, above, used windings of the same sense, configured to achieve the necessary balance and physically opposed field poles were therefore of the same electrical phase and magnetic polarity.

Figure 25:
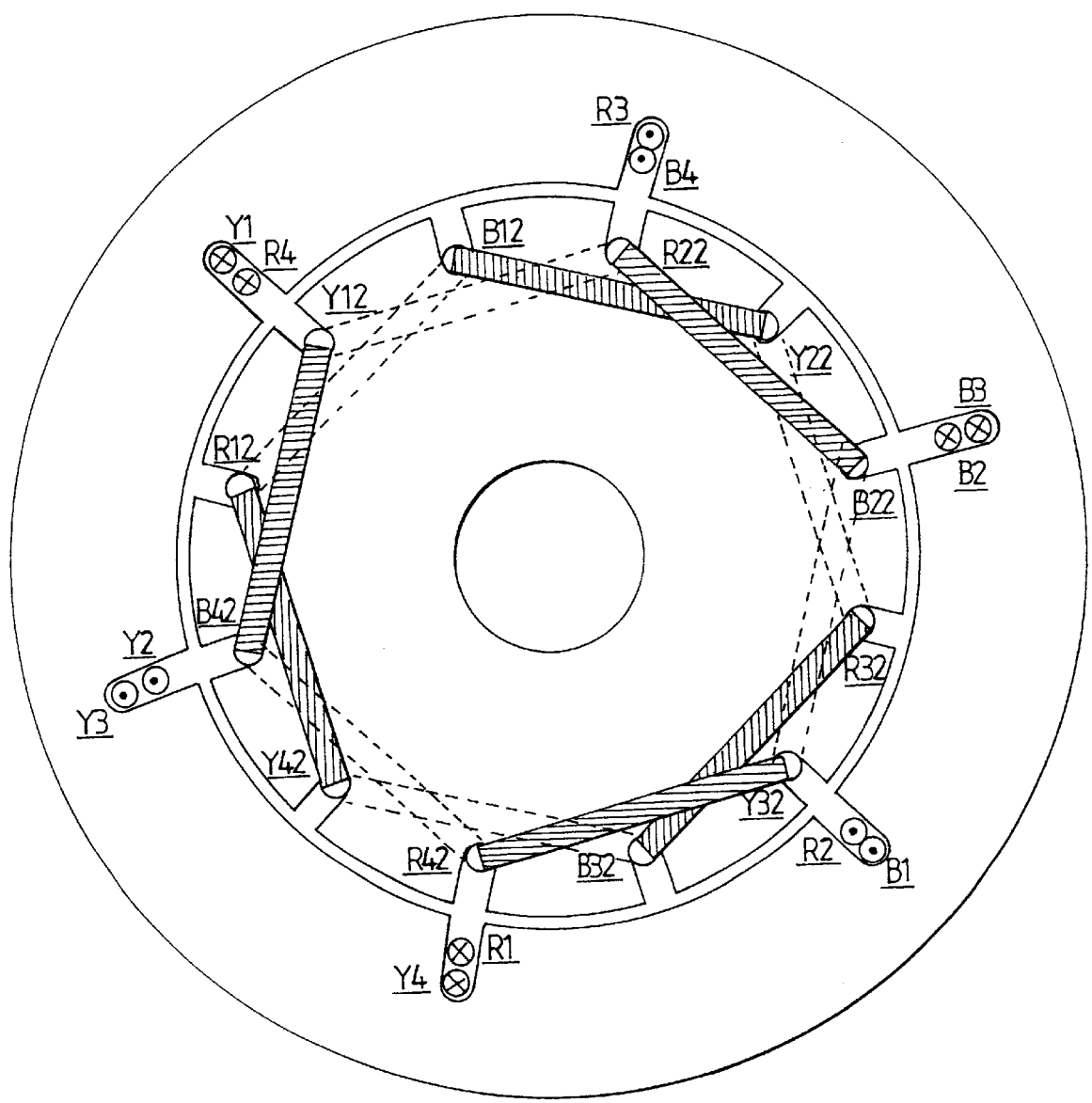
FIG. 25 shows a cross section through an a.c. motor of an tenth embodiment of the present invention.
Figure 26:
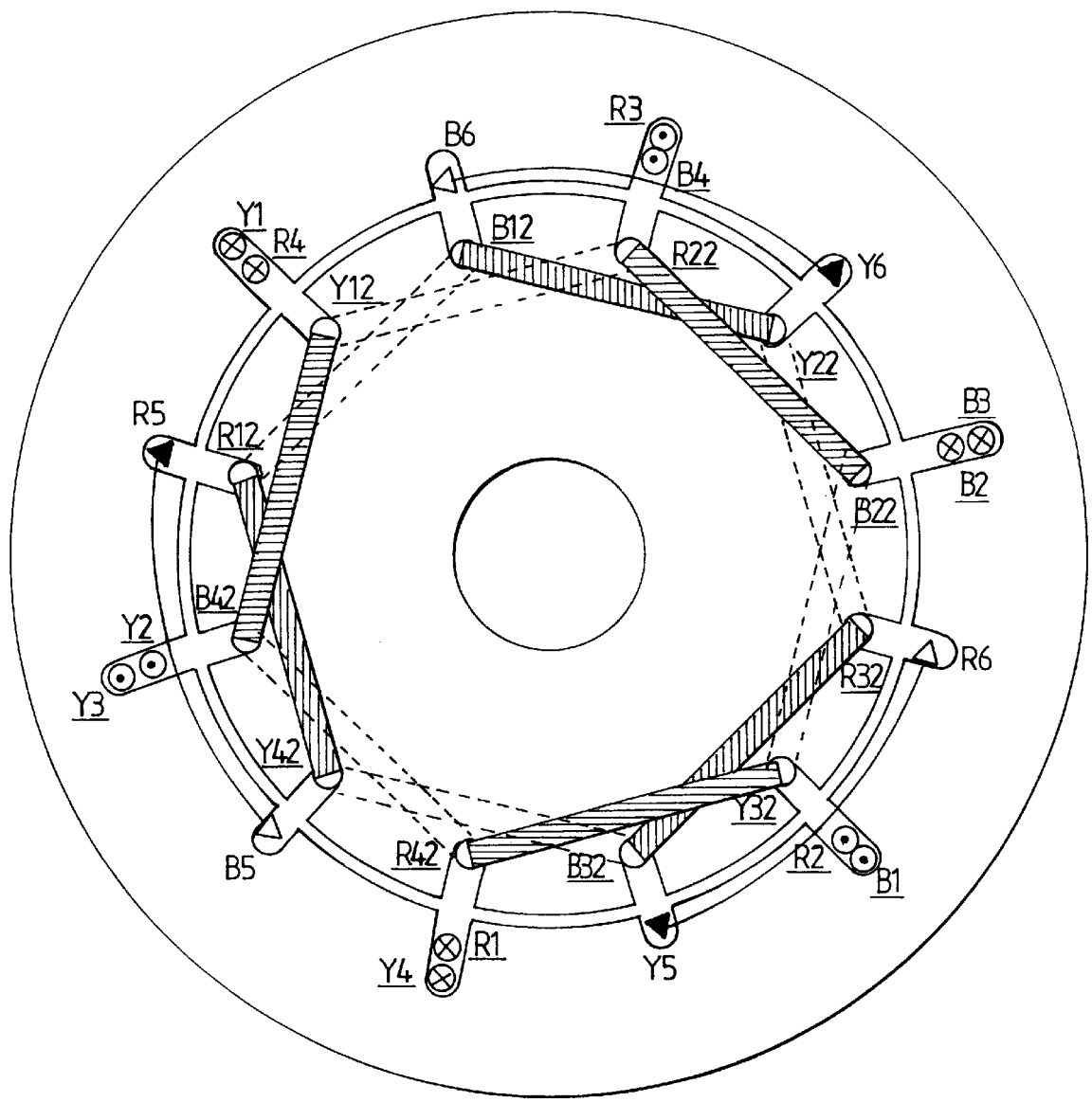
FIG. 26 shows a cross section through an a.c. motor of a eleventh embodiment of the present invention.

Consider now FIG. 25, in which the physically opposed field poles of the same electrical phase, are of opposite magnetic polarity; i.e. the set Y3,R4; Y1,B4; R3,B2 is opposite the set Y3,R1; Y4,B1; R2,B3 which also has the reversed phase sequence. For simplicity, only two of several identical rotor windings are shown. Each rotor winding is a continuous series of regular, zig-zags each spanning one sixth of the rotor circumference. The assembly is, in effect, a pair of equally excited, three-phase transformers with interleaved yokes and a set of opposed secondaries, which are in overall balance with zero current and with a maximum potential difference between B42 and B22, because for example, during rotation the sense of the rotor conductor at position R1 is automatically adjusted by the winding, relative to the adjacent pair of conductors, at B1 and Y2. However, potential differences will exist across certain rotor winding diameters and electrical linking across the rotor diameter cannot be employed in this alternative arrangement. Moreover, to apply an imbalance, as in alternative one, would be more difficult because there simply is not the equivalent, initial magnetic symmetry, or balance. If an imbalance is applied, say by reducing the supply to R1,Y1, B1, current will be induced in conductors under each pole and the rotor will accelerate, but because one side of the rotor is operating super-synchronously, while the other is sub-synchronous, a complex waveform containing two, speed related frequencies of rotor, e.m.f's. will be produced, which can be considered as sum and difference frequencies. The difference component will always be at the main power supply frequency and will be potentially useful, but the sum component will be at supply frequency plus twice the slip frequency and may cause currents likely to interfere with satisfactory operation at some condition.

If the balance of the stator field excitation is maintained and currents are induced in the rotor conductors by means of conductors set into each poleface, depicted as delta connected, unbalanced windings B6,Y6: R6,Y5: B5,R5 in FIG. 26 and energised with an adjustable three-phase supply, which is in phase with the field supply voltages, then single-phase rotor currents will flow, causing a corresponding torque in the rotor, which will accelerate if free to rotate, generating speed-related, e.m.f. which maintains an operational balance at a suitable running speed. This variation is therefore capable of operating without circulating power between the stator windings, but still providing adjustable speed by voltage control from a fixed frequency supply.

If the balance of the primaries in FIG. 25 is maintained and the rotor is rotated in either direction, then three phase, e.m.f's. will be induced in conductors under field poles of each triad and current will flow in opposite directions in pairs of conductors under opposed field poles of the same phase, attempting to oppose the motion. By transformer action, power will be transferred to the mains supply. It is noted that the system is internally symmetrical for one phase only (R1/R2) and relies upon external symmetry being provided by the mains, three phase supply, to ensure that the vector sum of currents in the Y and B phases is indeed equal and opposite to the R phase current. Nevertheless, it will be so where a population of machine is suitably connected with phase displacement between individual machines and this alternative arrangement offers the following, eminent advantages as a generator of mains electricity from marine waves.

It is capable of configuration as a multi-pole machine and to enable power generation from a low-speed, or an oscillatory source of mechanical power: e.g. waves in water, driving a float, paddle, wheel, or turbine.

It is inherently asynchronous, stable and low-loss when at rest, capable only of braking action and is suited to direct, three phase power generation at the applied system voltage and frequency, with only relatively simple protective devices, such as built-in fuses or circuit-breakers, and without additional control systems.

It requires and augments an existing mains supply, but is a slave, not a stand-alone generator, so system protection and the control of a population of such machines is anticipated to be straight-forward.

It can be preset to a selection of power or voltage ratings, merely by changing winding taps, within a previously designed range.

The detailed design can be firmly based in known art relating to d.c. and a.c. rotating electrical machines.

By building-in leakage reactance, load or fault limitation can be automatic, within each member of what might be a large population of devices in one locality.

Any singly occurring, significant electrical fault is likely to result in electromagnetic imbalance, leading to internal overload and tripping of the local protection device and therefore to prompt, self-disconnection from the system.

It can be inherently robust, requires little maintenance and, using known art, can be made weatherproof, or even submersible in sea water.

It can keep itself slightly warmer than its environment and therefore free of damaging condensation, without additional equipment.

It can be well suited to quantity production and to long periods of unattended operation in remote locations.

The skilled person will realise that if a secondary windings are free to rotate relative to the primary windings then the rotor and stator may need to be made from steel or iron whereas should the secondary windings be fixed relative (or be allowed to move by only a small amount) then other magnetic materials (such as ferrite) may be used. It will be realised that the forces induced on the rotor and stator in a rotating machine may be too much for materials such as ferrite to withstand.

What is claimed is:

1. An a.c. electrical machine comprising at least a first and a second transformer, each transformer including at least one primary coil mounted upon a first mounting and at least one secondary coil mounted upon a second mounting, said transformers being arranged to be inductively coupled each to at least one other and further arranged such that magnetic fields are produced solely or substantially solely by current flowing through said primary coils and said secondary coils, said secondary coils being interconnected and arranged such that said machine has a balanced state in which the voltages, currents, fluxes of said primary coils are such that substantially no current flows in the secondary coils and an un-balanced state in which said voltages, currents and fluxes of said primary coils are such that current flows in said secondary coils, and further arranged such that said primary coil mounting and said secondary coil mounting are moveably mounted relative to each other, the machine further comprising an unbalancer arranged to adjust said voltages, currents, fluxes, of at least one of said primary coils of said first transformer relative to said primary coils of said second transformer to introduce an electromagnetic unbalance between said transformers such that said machine enters said un-balanced state, thereby transferring electrical power between said primary and secondary coils, and transferring mechanical power between said first and second mountings.

2. An a.c. electrical machine according to claim 1 in which flux linkage between said primary coils and said secondary coils occurs across an air gap.

3. An a.c. electrical machine according to claim 1 in which said secondary coils are free to rotate with respect to said primary coils.

4. An a.c. electrical machine according to claim 3 in which the control of speed of said electrical machine at constant torque is achieved by alteration of the voltage across said primary coils.

5. An a.c. electrical machine according to claim 3 in which the control of speed of said electrical machine at constant power is achieved by alteration of the current flowing through said primary coils.

6. An a.c. electrical machine according to claim 3 which is a motor.

7. An a.c. electrical machine according to claim 3 which is an alternator.

8. An a.c. electrical machine according to claim 7 which is utilized as a wind turbine.

9. An a.c. electrical machine according to claim 7 which is utilized as a water turbine.

10. An a.c. electrical machine according to claim 7 which is utilized as a wave powered generator.

11. An a.c. electrical machine according to claim 1 in which there is provided a rotor and a stator.

12. An a.c. electrical machine according to claim 7 having at least one control coil mounted on said stator and which generates electricity at a fixed frequency dependent upon the frequency of excitation of said control windings but independent of the frequency of rotation of said rotor.

13. An a.c. electrical machine according to claim 11 in which said secondary coils of said transformers are mounted on said rotor.

14. An a.c. electrical machine according to claim 13 which comprises a three phase transformer in balanced opposition to a similar three phase transformer having interconnected secondaries arranged symmetrically on a common rotor.

15. An a.c. electrical machine according to claim 13 in which at least a second set of secondary coils are mounted on said rotor displaced from the first set by a small angle.

16. An a.c. electrical machine according to claim 13 in which said primary coils create a magnetic field and portions of said secondary coils running perpendicularly to said magnetic field from said primary coils comprise single conductors.

17. An a.c. electrical machine according to claim 13 in which said primary coils create a magnetic field and portions of said secondary coils running perpendicularly to said magnetic field from said primary coils comprise multiple conductors.

18. An a.c. electrical machine according to claim 13 in which said secondary coils are moved between a first position and a second position by rotation of said rotor relative to said stator.

19. An a.c. electrical machine according to claim 11 in which there are two distinct coils mounted on said rotor.

20. An a.c. electrical machine according to claim 11 in which there are three coils wound on said rotor.

21. An a.c. electrical machine according to claim 11 in which there are multiple coils wound on said rotor.

22. An a.c. electrical machine according to claim 11 in which said primary coils of said transformers are mounted on said stator.

23. An a.c. electrical machine according to claim 11 which has, in addition to the primary coil, at least one control coil mounted on said stator and associated with said primary coil.

24. An a.c. electrical machine according to claim 23 which has at least one said control coil for each said primary coil.

25. An a.c. electrical machine according to claim 23 in which the unbalancer is arranged to induce currents in said control coil so as to modify the currents flowing in said primary coils.

26. An a.c. electrical machine according to claim 23 in which said unbalancer is arranged to adjust the voltages across said control coils as to modify the currents flowing in said primary coils.

27. An a.c. electrical machine according to claim 23 in which superconducting conductors are utilized in said control windings.

28. An a.c. electrical machine according to claim 1 in which said primary coils are multi phase coils.

29. An a.c. electrical machine according to claim 28 in which said primary coils are three phase coils.

30. An a.c. electrical machine according to claim 29 in which one of said primary coils is connected in a star configuration and the other of said primary coils is connected in a delta configuration.

31. An a.c. electrical machine according to claim 29 in which both of said primary coils are connected in a star configuration.

32. An a.c. electrical machine according to claim 29 in which both of said primary coils are connected in a delta configuration.

33. An a.c. electrical machine according to claim 1 in which said secondary coils are multi phase coils.

34. An a.c. electrical machine according to claim 33 in which said secondary coils are three phase coils.

35. An a.c. electrical machine according to claim 34 in which both of said secondary coils are connected in a star configuration.

36. An a.c. electrical machine according to claim 34 in which both of said secondary coils are connected in a delta configuration.

37. An a.c. electrical machine according to claim 34 in which said secondary coils are provided in a single physical coil so as to provide two or more effective delta configured circuits.

38. An a.c. electrical machine according to claim 34 in which both of said secondary coils are provided in a single physical coil so as to provide two effective star configured circuits.

39. An a.c. electrical machine according to claim 1 in which said secondary coils are wave wound.

40. An a.c. electrical machine according to claim 1 in which said primary coils are excited with a pulse width modulated supply.

41. An a.c. electrical machine according to claim 1 which is powered from a three phase supply electronically generated from a battery supply.

42. An a.c. electrical machine according to claim 1 which is submersible in water.

43. An a.c. electrical machine according to claim 1 in which an interior of the machine is cooled below a temperature allowing superconductors to operate.

44. An a.c. electrical machine according to claim 1 which utilizes superconducting conductors in said primary or said secondary coils.

45. An a.c. electrical machine according to claim 1 which utilizes an electronic power supply.

46. An a.c. electrical machine according to claim 1 which utilizes an inverter type power supply.

47. An a.c. electrical machine comprising at least a first and a second transformer, each transformer including at least one primary coil mounted upon a stator and at least one secondary coil mounted upon a rotor, said transformers being arranged to be inductively coupled each to at least one other and further arranged such that magnetic fields are produced solely or substantially solely by current flowing through said primary coils and said secondary coils, said secondary coils of said machine being interconnected and arranged such that said machine has a balanced state in which the voltages, currents, fluxes, of said primary coils are such that substantially no current flows in the secondary coils and an un-balanced state in which said voltages, currents and fluxes of said primary coils are such that current flows in the secondary coils, and further arranged such that said primary coils and said secondary coils are moveably mounted relative to each other, the machine further comprising an unbalancer arranged to adjust said voltages, currents, fluxes, of at least one of said primary coils of said first transformer relative to said primary coils of said second transformer to introduce an electromagnetic unbalance between said transformers such that said machine enters said un-balanced state, thereby transferring electrical power between said primary and secondary coils, and transferring mechanical power between said first and second mountings.

* * * * *